US011201644B2

(12) United States Patent
Shattil

(10) Patent No.: US 11,201,644 B2
(45) Date of Patent: Dec. 14, 2021

(54) COOPERATIVE WIRELESS NETWORKS

(71) Applicant: Genghiscomm Holdings, LLC, Boulder, CO (US)

(72) Inventor: Steve Shattil, Cheyenne, WY (US)

(73) Assignee: Genghiscomm Holdings, LLC, Boulder, CO (US)

( * ) Notice: Subject to any disclaimer, the term of this patent is extended or adjusted under 35 U.S.C. 154(b) by 0 days.

(21) Appl. No.: 14/727,769

(22) Filed: Jun. 1, 2015

(65) Prior Publication Data

US 2015/0263835 A1    Sep. 17, 2015

Related U.S. Application Data

(60) Continuation of application No. 14/276,309, filed on May 13, 2014, now Pat. No. 9,048,897, which is a (Continued)

(51) Int. Cl.
*H04B 7/0452* (2017.01)
*H04B 1/00* (2006.01)
(Continued)

(52) U.S. Cl.
CPC ......... *H04B 7/0452* (2013.01); *H04B 1/0003* (2013.01); *H04B 7/024* (2013.01); (Continued)

(58) Field of Classification Search
CPC .......................... H04W 28/04; H04W 72/0446
See application file for complete search history.

(56) References Cited

U.S. PATENT DOCUMENTS 4,550,402 A    10/1985    Gable et al.
4,700,341 A    10/1987    Huang
(Continued)

FOREIGN PATENT DOCUMENTS

WO    0237771    5/2002

OTHER PUBLICATIONS

Y. Tang and M.C. Valenti, "Coded transmit macrodiversity: Block space-time codes over distributed antennas," in Proc. IEEE Vehicular Tech. Conf (VTC), Rhodes, Greece, May 2001, pp. 1435-1438.
(Continued)

*Primary Examiner* — Samina F Choudhry
(74) *Attorney, Agent, or Firm* — Steven J Shattil

(57) ABSTRACT

A cooperative multi-user multiple input, multiple output (MIMO) antenna array comprises a MIMO subspace processing system communicatively coupled by a fronthaul network to a set of antennas residing on multiple ones of a plurality of geographically distributed wireless terminals in a Radio Access Network. The MIMO subspace processing system can comprise a distributed computing system. The MIMO antenna array is adapted by updating the set of antennas to produce a second set of antennas; reconfiguring the fronthaul network; selecting an updated set of distributed computing resources to perform MIMO subspace processing; and reconfiguring the MIMO subspace processing to employ channel state information of the second set to enable multiple non-interfering subspace channels occupying a common frequency.

13 Claims, 17 Drawing Sheets

Related U.S. Application Data continuation of application No. 12/545,572, filed on Aug. 21, 2009, now Pat. No. 8,750,264, which is a division of application No. 11/187,107, filed on Jul. 22, 2005, now Pat. No. 8,670,390, which is a continuation-in-part of application No. 10/145,854, filed on May 14, 2002, now abandoned.

(60) Provisional application No. 60/598,187, filed on Aug. 2, 2004.

(51) Int. Cl.

| | |
|---|---|
| *H04B 7/026* | (2017.01) |
| *H04J 13/00* | (2011.01) |
| *H04L 27/26* | (2006.01) |
| *H04L 12/707* | (2013.01) |
| *H04L 12/801* | (2013.01) |
| *H04L 5/00* | (2006.01) |
| *H04B 7/0456* | (2017.01) |
| *H04B 7/024* | (2017.01) |
| *H04B 7/06* | (2006.01) |
| *H04L 27/01* | (2006.01) |
| *H04L 27/148* | (2006.01) |
| *H04J 13/12* | (2011.01) |
| *H04W 72/04* | (2009.01) |
| *H04W 84/18* | (2009.01) |

(52) U.S. Cl.
CPC ........... *H04B 7/026* (2013.01); *H04B 7/0456* (2013.01); *H04B 7/0697* (2013.01); *H04J 13/0003* (2013.01); *H04J 13/004* (2013.01); *H04L 5/0007* (2013.01); *H04L 5/0023* (2013.01); *H04L 5/0035* (2013.01); *H04L 5/0037* (2013.01); *H04L 5/0073* (2013.01); *H04L 27/01* (2013.01); *H04L 27/148* (2013.01); *H04L 27/2602* (2013.01); *H04L 27/265* (2013.01); *H04L 27/2636* (2013.01); *H04L 27/2646* (2013.01); *H04L 27/2647* (2013.01); *H04L 45/24* (2013.01); *H04L 47/10* (2013.01); *H04J 13/12* (2013.01); *H04L 5/0021* (2013.01); *H04L 27/2601* (2013.01); *H04L 27/2614* (2013.01); *H04W 72/046* (2013.01); *H04W 84/18* (2013.01)

(56) References Cited

U.S. PATENT DOCUMENTS

| | | |
|---|---|---|
| 5,412,648 A | 5/1995 | Fan |
| 5,630,154 A | 5/1997 | Bolstad et al. |
| 5,694,393 A | 12/1997 | Kaye |
| 5,704,013 A | 12/1997 | Watari et al. |
| 5,793,759 A | 8/1998 | Rakib et al. |
| 5,940,379 A | 8/1999 | Startup et al. |
| 5,943,332 A | 8/1999 | Liu et al. |
| 5,955,992 A | 9/1999 | Shattil |
| 6,047,190 A | 4/2000 | Haleem et al. |
| 6,055,432 A | 4/2000 | Haleem et al. |
| 6,144,711 A | 11/2000 | Raleigh et al. |
| 6,211,671 B1 | 4/2001 | Shattil |
| 6,233,248 B1 | 5/2001 | Sautter et al. |
| 6,236,642 B1 | 5/2001 | Shaffer et al. |
| 6,243,581 B1 | 6/2001 | Jawanda |
| 6,266,702 B1 | 7/2001 | Darnell et al. |
| 6,292,473 B1 | 9/2001 | Duske et al. |
| 6,320,897 B1 | 11/2001 | Fattouche et al. |
| 6,389,034 B1 | 5/2002 | Guo et al. |
| 6,434,390 B2 | 8/2002 | Rahman |
| 6,507,319 B2 | 1/2003 | Sikina |
| 6,532,224 B1 | 3/2003 | Dailey |
| 6,567,482 B1 | 5/2003 | Popovic |
| 6,650,645 B2 | 11/2003 | Scott et al. |
| 6,662,024 B2 | 12/2003 | Walton et al. |
| 6,665,521 B1 | 12/2003 | Gorday et al. |
| 6,667,714 B1 | 12/2003 | Solondz |
| 6,674,999 B2 | 1/2004 | Ramachandran |
| 6,686,879 B2 | 2/2004 | Shattil |
| 6,704,794 B1 | 3/2004 | Kejriwal et al. |
| 6,728,295 B1 | 4/2004 | Nallanathan et al. |
| 6,751,187 B2 | 6/2004 | Walton et al. |
| 6,778,514 B1 | 8/2004 | Boccussi et al. |
| 6,785,513 B1 | 8/2004 | Sivaprakasam |
| 6,832,251 B1 | 12/2004 | Gelvin et al. |
| 6,907,270 B1 | 6/2005 | Blanz |
| 6,928,047 B1 | 8/2005 | Xia |
| 6,944,168 B2 | 9/2005 | Paatela et al. |
| 6,980,768 B2 | 12/2005 | Arend et al. |
| 6,982,968 B1 | 1/2006 | Barratt et al. |
| 6,996,076 B1 | 2/2006 | Forbes et al. |
| 7,010,015 B2 | 3/2006 | Hervey et al. |
| 7,010,048 B1 | 3/2006 | Shattil |
| 7,020,110 B2 | 3/2006 | Walton et al. |
| 7,031,309 B1 | 4/2006 | Sautter et al. |
| 7,057,555 B2 | 6/2006 | Lewis |
| 7,076,168 B1 | 7/2006 | Shattil |
| 7,139,321 B2 | 11/2006 | Giannakis et al. |
| 7,149,211 B2 | 12/2006 | Bennett et al. |
| 7,154,936 B2 | 12/2006 | Bjerke et al. |
| 7,155,255 B2 | 12/2006 | Blum et al. |
| 7,158,504 B2 | 1/2007 | Kadaba et al. |
| 7,194,766 B2 | 3/2007 | Noehring et al. |
| 7,197,084 B2 | 3/2007 | Ketchum et al. |
| 7,263,133 B1 | 8/2007 | Miao |
| 7,283,799 B2 | 10/2007 | Shattil |
| 7,286,604 B2 | 10/2007 | Shattil |
| 7,317,750 B2 | 1/2008 | Shattil |
| 7,391,804 B2 | 6/2008 | Shattil |
| 7,406,261 B2 | 7/2008 | Shattil |
| 7,418,043 B2 | 8/2008 | Shattil |
| 7,508,798 B2 | 3/2009 | Tong et al. |
| 7,570,956 B2 | 8/2009 | Bigham et al. |
| 7,593,449 B2 | 9/2009 | Shattil |
| 7,594,010 B2 | 9/2009 | Dohler et al. |
| 7,606,137 B2 | 10/2009 | Shattil |
| 7,787,514 B2 | 8/2010 | Shattil |
| 7,876,729 B1 * | 1/2011 | Grilli ............... H04W 36/14 370/332 |
| 8,107,965 B2 | 1/2012 | Hui et al. |
| 8,301,139 B2 | 10/2012 | Lotze et al. |
| 8,320,301 B2 * | 11/2012 | Walton ............... H04B 7/022 370/328 |
| 8,396,153 B1 | 3/2013 | Shen et al. |
| 8,498,647 B2 | 7/2013 | Gorokhov et al. |
| 8,780,830 B2 | 7/2014 | Doppler et al. |
| 2002/0034191 A1 | 3/2002 | Shattil |
| 2002/0051433 A1 | 5/2002 | Affes et al. |
| 2002/0118727 A1 | 8/2002 | Kim et al. |
| 2002/0118781 A1 | 8/2002 | Thomas et al. |
| 2002/0127978 A1 | 9/2002 | Khatri |
| 2002/0137472 A1 | 9/2002 | Quinn et al. |
| 2002/0181509 A1 | 12/2002 | Mody et al. |
| 2002/0193146 A1 * | 12/2002 | Wallace ............... H04B 7/0417 455/562.1 |
| 2003/0026222 A1 | 2/2003 | Kotzin |
| 2003/0043732 A1 * | 3/2003 | Walton ............... H04L 1/0009 370/208 |
| 2003/0048984 A1 * | 3/2003 | Ng ............... H04B 10/25073 385/24 |
| 2003/0072380 A1 | 4/2003 | Huang |
| 2003/0128658 A1 | 7/2003 | Walton et al. |
| 2003/0133469 A1 | 7/2003 | Brockmann et al. |
| 2003/0154262 A1 | 8/2003 | Kaiser et al. |
| 2003/0161282 A1 * | 8/2003 | Medvedev ............ H04L 5/0025 370/329 |
| 2003/0206527 A1 | 11/2003 | Yim |
| 2004/0047405 A1 | 3/2004 | Boesel et al. |
| 2004/0095907 A1 * | 5/2004 | Agee ............... H04B 7/0417 370/334 |
| 2004/0223476 A1 | 11/2004 | Jose et al. |
| 2005/0198199 A1 | 9/2005 | Dowling |

(56) References Cited

U.S. PATENT DOCUMENTS

| | | |
|---|---|---|
| 2005/0265275 A1 | 12/2005 | Howard et al. |
| 2005/0286476 A1 | 12/2005 | Crosswy et al. |
| 2006/0023803 A1* | 2/2006 | Perlman ............... H04B 7/0684 375/267 |
| 2012/0093078 A1* | 4/2012 | Perlman ............... H04B 7/0626 370/328 |
| 2013/0077508 A1 | 3/2013 | Axmon et al. |

OTHER PUBLICATIONS

Non-Final Office Action dated Apr. 27, 2006 from corresponding U.S. Appl. No. 10/145,854.
Non-Final Office Action dated Nov. 27, 2006 from corresponding U.S. Appl. No. 10/145,854.
Non-Final Office Action dated Apr. 9, 2007 from corresponding U.S. Appl. No. 10/145,854.
Non-Final Office Action dated Sep. 9, 2008 from corresponding U.S. Appl. No. 10/145,854.
Notice of Allowance dated Feb. 25, 2009 from corresponding U.S. Appl. No. 10/145,854.
G. Barriac, et al. Distributed Beamforming for Information Transfer in Sensor Networks, Apr. 26-27, 2004, Berkeley, CA, ACM 1-58113-6/04/0004.
Non-Final Office Action dated Apr. 8, 2008 from corresponding U.S. Appl. No. 11/187,107.
Final Office Action dated Feb. 25, 2009 from corresponding U.S. Appl. No. 11/187,107.
Non-Final Office Action dated Nov. 2, 2009 from corresponding U.S. Appl. No. 11/187,107.
Non-Final Office Action dated May 25, 2010 from corresponding U.S. Appl. No. 11/187,107.
Non-Final Office Action dated Oct. 18, 2010 from corresponding U.S. Appl. No. 11/187,107.
Non-Final Office Action dated Mar. 30, 2011 from corresponding U.S. Appl. No. 11/187,107.
Non-Final Office Action dated Jan. 4, 2012 from corresponding U.S. Appl. No. 11/187,107.
Non-Final Office Action dated Oct. 4, 2012 from corresponding U.S. Appl. No. 11/187,107.
Non-Final Office Action dated Jul. 25, 2013 from corresponding U.S. Appl. No. 11/187,107.
Notice of Allowance dated Nov. 20, 2013 from corresponding U.S. Appl. No. 11/187,107.
Non-Final Office Action dated Oct. 14, 2011 from corresponding U.S. Appl. No. 12/545,572.
Final Office Action dated Feb. 28, 2012 from corresponding U.S. Appl. No. 12/545,572.
Non-Final Office Action dated Oct. 5, 2012 from corresponding U.S. Appl. No. 12/545,572.
Non-Final Office Action dated Jun. 6, 2013 from corresponding U.S. Appl. No. 12/545,572.
Final Office Action dated Jan. 2, 2014 from corresponding U.S. Appl. No. 12/545,572.
Notice of Allowance dated Apr. 14, 2014 from corresponding U.S. Appl. No. 12/545,572.
Notice of Allowance dated Apr. 9, 2015 from corresponding U.S. Appl. No. 14/276,309.
Notice of Allowance dated Apr. 9, 2015 from corresponding U.S. Appl. No. 14/275,161.
Non-Final Office Action dated Jan. 21, 2015 from corresponding U.S. Appl. No. 14/511,585.
Notice of Allowance dated May 12, 2015 from corresponding U.S. Appl. No. 14/511,585.
Notice of Allowance dated Nov. 21, 2014 from corresponding U.S. Appl. No. 14/168,442.

* cited by examiner

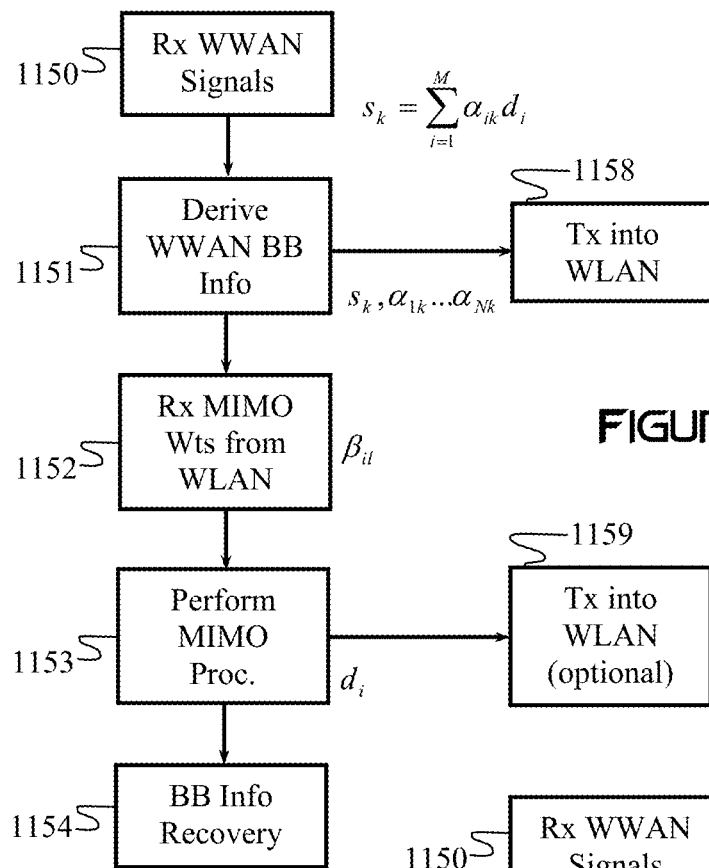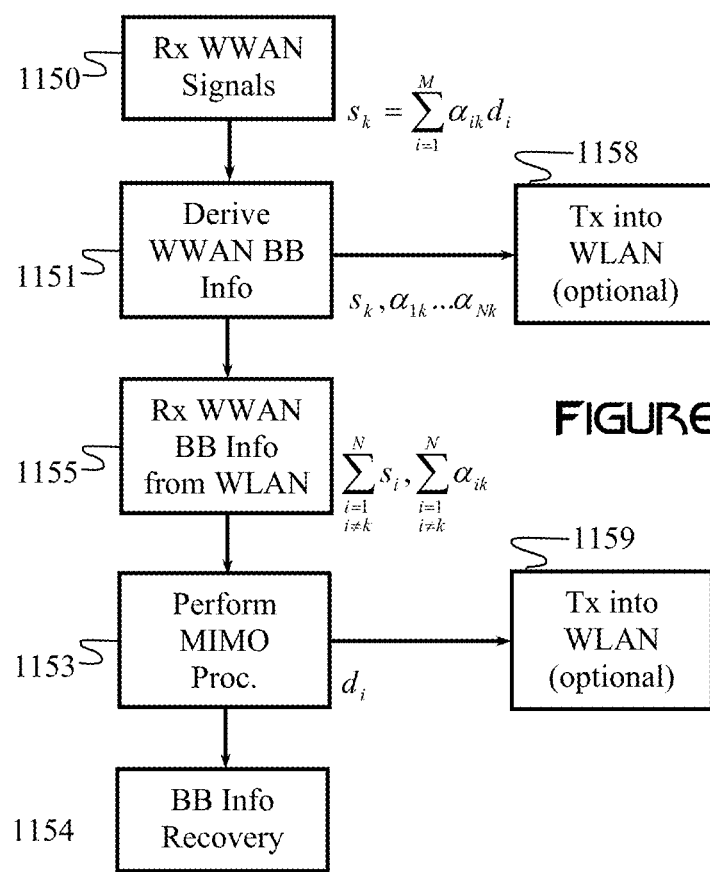

COOPERATIVE WIRELESS NETWORKS

RELATED APPLICATIONS

This application is a Continuation of U.S. patent application Ser. No. 14/276,309, entitled "Cooperative Wireless Networks," filed May 13, 2014, which is a Continuation of U.S. patent application Ser. No. 12/545,572, entitled "Cooperative Wireless Networks," filed Aug. 21, 2009, now U.S. Pat. No. 8,750,264, which is a Divisional of U.S. patent application Ser. No. 11/187,107, entitled "Cooperative Beam-Forming in Wireless Networks," filed on Jul. 22, 2005, now U.S. Pat. No. 8,670,390, which claims priority to Provisional Appl. No. 60/598,187, filed Aug. 2, 2004 and is a Continuation In Part of U.S. patent application Ser. No. 10/145,854, entitled "Carrier Interferometry Networks," which was filed on May 14, 2002, all of which are incorporated by reference in their entireties.

BACKGROUND OF THE INVENTION

I. Field of the Invention

The present invention relates generally to antenna-array processing and ad-hoc networking, and particularly to providing cooperative signal processing between a plurality of wireless terminal devices, such as to improve network access.

II. Description of the Related Art

Wireless data service is an emerging market with high growth potential. However, market growth requires higher bandwidth and better coverage than cellular technologies can provide. Furthermore, state-of-the-art wireless network technologies are mainly focused on the server side, rather than using mobile wireless terminals to extend the network infrastructure.

A peer-to-peer mode of communication is expected to offer distinct performance benefits over the conventional cellular model, including better spatial-reuse characteristics, lower energy consumption, and extended coverage areas. The key advantage of the peer-to-peer network model is the increase in spatial reuse due to its short-range transmissions. Although peer-to-peer networking shows some promise, there are significant drawbacks that prevent conventional peer-to-peer networks from being a technically and commercially viable solution.

Recent analyses of multi-hop networks compared to cellular networks have indicated that the spatial reuse improvement in the peer-to-peer network model does not translate into greater throughput. Rather, the throughput is lower than that observed in the cellular network model. This observation is explained in three parts:

Multi-hop Routes: Although the spatial reuse is increased, since a flow traverses multiple hops in the peer-to-peer network model, the end-to-end throughput of a flow, while directly proportional to the spatial reuse, is also inversely proportional to the hop-length. Moreover, since the expected hop-length in a dense network is of the order of $O(\sqrt{n})$, a tighter bound on the expected per-flow throughput is $O(1/\sqrt{n})$. While this bound is still higher than that of the dense cellular network model ($O(1/n)$), the following two reasons degrade the performance even more.

Base-Station Bottleneck: The degree of spatial reuse and expected per-flow throughput of the peer-to-peer network model is valid for a network where all flows have destinations within the same cell. In this case, the base station is the destination for all flows (e.g., it is the destination of the wireless path). Thus, any increase in spatial reuse cannot be fully realized as the channel around the base-station becomes a bottleneck and has to be shared by all the flows in the network. Note that this is not an artifact of the single-channel model. As long as the resources around the base-station are shared by all the flows in the network (irrespective of the number of channels), the performance of the flows will be limited to that of the cellular network model.

Protocol Inefficiencies: The protocols used in the cellular network model are both simple and centralized, with the base station performing most of the coordination. Cellular protocols operate over a single hop, leading to very minimal performance degradation because of protocol inefficiencies. However, in the peer-to-peer network model, the protocols (such as IEEE 802.11 and DSR) are distributed, and they operate over multiple hops. The multi-hop path results in more variation in latency, losses, and throughput for TCP. These inefficiencies (which arise because of the distributed operation of the medium access and routing layers) and the multi-hop operation at the transport layer translate into a further degraded performance.

Similarly, antenna-array processing has demonstrated impressive improvements in coverage and spatial reuse. Array-processing systems typically employ multiple antennas at base stations to focus transmitted and received radio energy and thereby improve signal quality. In cellular communications, improvements in signal quality lead to system-wide benefits with respect to coverage, service quality and, ultimately, the economics of cellular service. Furthermore, the implementation of antenna arrays at both ends of a communication link can greatly increase the capacity and performance benefits via Multiple Input Multiple Output (MIMO) processing. However, power, cost, and size constraints typically make the implementation of antenna arrays on mobile wireless terminals, such as handsets or PDAs, impractical.

In cooperative diversity, each wireless terminal is assigned an orthogonal signal space relative to the other terminals for transmission and/or reception. In particular, both multiplexing and multiple access in cooperative diversity are orthogonal. In antenna-array processing, either or both multiplexing and multiple access are non-orthogonal. Specifically, some form of interference cancellation is required to separate signals in an array-processing system because transmitted and/or received information occupies the same signal space.

Applications and embodiments of the present invention relate to ad-hoc networking and antenna-array processing. Embodiments of the invention may address general and/or specific needs that are not adequately serviced by the prior art, including (but not limited to) improving network access (e.g., enhancing range, coverage, throughput, connectivity, and/or reliability). Applications of certain embodiments of the invention may include tactical, emergency response, and consumer wireless communications. Due to the breadth and scope of the present invention, embodiments of the invention may be provided for achieving a large number of objectives and applications, which are too numerous to list herein. Therefore, only some of the objects and advantages of specific embodiments of the present invention are discussed in the Summary and in the Preferred Embodiments.

SUMMARY OF THE INVENTION

Some of the exemplary embodiments of the present invention are summarized as follows. Embodiments of the invention include beam-forming systems configured to enable spatially separated wireless terminals (WTs) to perform beam-forming operations in a wireless wide area network (WWAN). A wireless local area network (WLAN) couples together the WTs, which may be configured to share WWAN data, access, and control information. A beam-forming system may comprise the WTs, which function as elements of an antenna array. WWAN network access functions (such as monitoring control channels and exchanging control messages with the WWAN) may be provided in a centralized or a distributed manner with respect to the WTs.

Embodiments of the invention also include systems and methods configured for allocating network resources among the WTs, load balancing, distributed computing, antenna-switching diversity, WWAN diversity, interference mitigation, hand off, power control, authentication, session management, ad-hoc network control, error correction coding, and interference mitigation. Other embodiments and variations thereof are described in the Description of Preferred Embodiments.

In one embodiment, a computer program comprises a beam-forming weight calculation source code segment adapted to calculate at least one set of beam-forming weights for signaling between at least one group of WTs and at least one WWAN, and a WLAN information-distribution source code segment adapted to distribute at least one of a set of signals between the at least one group of WTs, the set of signals including a plurality of received WWAN signals, a plurality of WWAN transmission data, and the at least one set of beam-forming weights.

In another embodiment. a computer program comprises a beam-forming weight source code segment adapted to calculate at least one set of beam-forming weights for signaling between at least one group of WTs and at least one WWAN, and a MIMO combining source code segment adapted to combine a plurality of weighted received WWAN signals, at least one of the beam-forming weight source code segment and the MIMO combining source code segment including WLAN information-distribution source code adapted to distribute at least one of a set of signals between the at least one group of wireless terminals, the set of signals including a plurality of received WWAN signals, a plurality of WWAN transmission data, at least one channel estimate, and the at least one set of beam-forming weights.

A receiver embodiment of the invention comprises a plurality of WWAN interfaces, wherein each WWAN interface is adapted to receive at least one transmitted WWAN signal; a plurality of baseband processors wherein each baseband processor is coupled to at least one WWAN interface in the plurality of WWAN interfaces, the plurality of baseband processors adapted to generate a plurality of WWAN baseband signals; at least one WLAN coupled to the plurality of baseband processors; and at least one MIMO combiner adapted to receive at least one WWAN baseband signal from the WLAN, the at least one MIMO combiner adapted to perform MIMO combining of a plurality of WWAN baseband signals.

A transmitter embodiment of the invention comprises a plurality of WWAN interfaces wherein each WWAN interface is adapted to transmit at least one WWAN signal; at least one data source adapted to generate at least one data signal for transmission into at least one WWAN; at least one WLAN adapted to couple the at least one data signal to the plurality of WWAN interfaces for generating a plurality of WWAN data signals; and at least one MIMO processor adapted to generate a plurality of complex weights for weighting the plurality of WWAN data signals.

A wireless terminal according to one aspect of the invention comprises at least one WWAN interface; at least one WLAN interface; and at least one cooperative beam-forming system coupled between the WWAN interface and the WLAN interface and adapted to perform beamforming with information received from the WLAN interface.

Receivers and cancellation systems described herein may be employed in subscriber-side devices (e.g., cellular handsets, wireless modems, and consumer premises equipment) and/or server-side devices (e.g., cellular base stations, wireless access points, wireless routers, wireless relays, and repeaters). Chipsets for subscriber-side and/or server-side devices may be configured to perform at least some of the receiver and/or cancellation functionality of the embodiments described herein.

Additional embodiments, objects, and advantages are described and inferred from the following detailed descriptions and figures. Although particular embodiments are described herein, many variations and permutations of these embodiments fall within the scope and spirit of the invention. Although some benefits and advantages of the preferred embodiments are mentioned, the scope of the invention is not intended to be limited to particular benefits, uses, or objectives. Rather, embodiments of the invention are intended to be broadly applicable to different wireless technologies, system configurations, networks, and transmission protocols, some of which are illustrated by way of example in the figures and in the following description of the preferred embodiments. The detailed description and drawings are merely illustrative of the invention rather than limiting, the scope of the invention being defined by the appended claims and equivalents thereof.

BRIEF DESCRIPTION OF THE DRAWINGS

FIG. 5A illustrates a receiver embodiment of the invention that may be implemented by hardware and/or software.

FIG. 5B illustrates an alternative receiver embodiment of the invention.

DESCRIPTION OF PREFERRED EMBODIMENTS

Figure 1A:
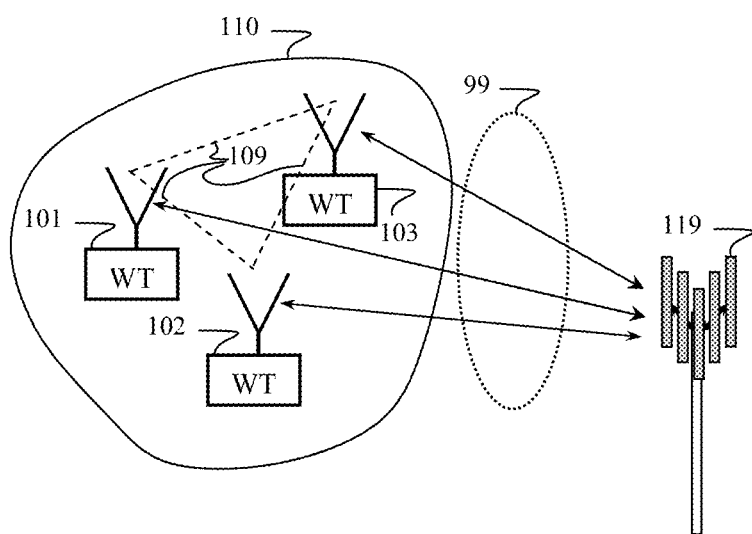
FIG. 1A illustrates an application of various embodiments of the invention to a cellular network.

While the invention is susceptible to various modifications and alternative forms, specific embodiments thereof are shown by way of example in the drawings and are herein described in detail. It should be understood, however, that the exemplary embodiments are not intended to limit the invention to the particular forms disclosed. Instead, the invention is to cover all modifications, equivalents, and alternatives falling within the spirit and scope of the invention as defined by the claims.

FIG. 1A illustrates how some embodiments of the invention may be employed in a cellular network. Each wireless terminal (WT) of a plurality of WTs 101-103 is in radio contact with at least one wireless wide area network (WWAN) terminal, which may also be referred to as a WWAN node, such as cellular base station 119. The cellular base station 119 may include one or more antennas (e.g., an antenna array). WWAN signals transmitted between the base station 119 and the WTs 101-103 propagate through a WWAN channel 99, which is typically characterized by AWGN, multipath effects, and may include external interference.

The WTs 101-103 represent a wireless local area network (WLAN) group 110 (or local group) if they are currently connected or are capable of being connected via a WLAN 109. Accordingly, the WTs may be adapted to connect to at least one WWAN and to at least one WLAN. The WLAN group 110 may consist of two or more WTs in close enough proximity to each other to maintain WLAN communications. A given WWAN may include one or more WLAN groups, such as WLAN group 110.

In an exemplary embodiment of the present invention, the WTs 101-103 may be configured to transmit data $d_t(n)$ over a WWAN channel to the base station 119. The WTs 101-103 may also be configured to receive data $d_r(n)$ on a WWAN channel from the base station 119. The received data $d_r(n)$ is shared by the WTs 101-103 via the WLAN 109. Similarly, the transmitted data $d_t(n)$ may be distributed to the WTs 101-103 via the WLAN 109. The WLAN 109 typically comprises the wireless-communication resource between the WTs 101-103 and the associated physical-layer interface hardware. The WLAN 109 is differentiated from a WWAN by its relatively shorter range. For example, a Bluetooth or UWB system functioning within an IEEE 802.11 network would be referred to as a WLAN, whereas the 802.11 network would be referred to as a WWAN. A WLAN may operate in a different frequency band than the WWAN. Alternatively, other orthogonalizing techniques may be employed for separating WLAN and WWAN signals from each other. WLANs and WWANs, as defined herein, may employ any type of free-space transmissions, including, but not limited to, ultra-low frequency, RF, microwave, infrared, optical, and acoustic transmissions. WLANs and WWANs may employ any type of transmission modality, including, but not limited to, wideband, UWB, spread-spectrum, multi-band, narrowband, or dynamic-spectrum communications.

The WLAN 109 may also comprise the WLAN network-control functionality commonly associated with a WLAN, and the WWAN-access control functionality required to distribute necessary WWAN-access parameters (e.g., node addresses, multiple-access codes, channel assignments, authentication codes, etc.) between active WTs 101-103. The distribution of WWAN-access parameters between multiple WTs 101-103 enables each WT 101-103 to be responsive to transmissions intended for a particular WT in the local group and/or it enables a plurality of WTs 101-103 to function as a single WT when transmitting signals into the WWAN channel 99.

Particular embodiments of the invention provide for adapting either or both the transmitted data $d_t(n)$ and the received data $d_r(n)$ in order to perform beamforming. Specifically, the group of WTs 110 may be adapted to perform antenna-array processing by linking the individual WTs together via WLAN links 109 and employing appropriate antenna-array processing on the transmitted and/or the received data, $d_t(n)$ and $d_r(n)$, respectively.

Ad-hoc wireless networks (e.g., multi-hop and peer-to-peer networks) may employ intermediate relay nodes to convey transmissions from a source to a destination. Relays reduce the transmission power requirements for sending information over a given distance. This indirectly increases the spatial-reuse factor, thus enhancing system-wide bandwidth efficiency. For this reason, ad-hoc wireless networking works particularly well with unlicensed spectrum, which is characterized by restrictive power limitations and high path loss compared to cellular bands. Similarly, for certain embodiments of the invention, it may be preferable to employ high-loss (e.g., high-frequency) channels for the WLAN connections 109.

The capacity of wireless ad-hoc networks is constrained by interference caused by the neighboring nodes, such as shown in P. Gupta and P. R. Kumar, "The Capacity of Wireless Networks," IEEE Trans. Info. Theory, vol. IT-46, no. 2, March 2000, pp. 388-404 and in A. Agarwal and P. R. Kumar, "Improved capacity bounds for wireless networks." Wireless Communications and Mobile Computing, vol. 4, pp. 251-261, 2004, both of which are incorporated by reference herein. Using directional antennas (such as antenna arrays) reduces the interference area caused by each node, which increases the capacity of the network. However, the use of directional antennas and antenna arrays on the WTs 101-103 is often not feasible, especially when there are size constraints, power restrictions, cost constraints, and/or mobility needs. Thus, some embodiments of the present invention may provide for enabling WTs to form groups that cooperate in network-access functions. This provides each member of a given WLAN group with greater network access, as well as other benefits.

Antenna-array processing is generally categorized as multiple-input, single-output (MISO), single-input, multiple-output (SIMO) or multiple input, multiple output (MIMO). Array processing often employs beam forming in at least one predetermined signal space or signal sub-space. For example, phased-array processing involves coherent beamforming of at least one transmitted signal frequency. Sub-space processing often employs some form of baseband interference cancellation or multi-user detection. Other variations of phased-array and sub-space processing also exist and may be implemented in embodiments of the present invention.

Sub-space processing is commonly employed via space-time processing (e.g., Rake receivers are employed in a frequency-selective channel) and/or space-frequency processing (e.g., frequency-domain processing is employed to provide for multiple flat-fading channels). Similarly, sub-space processing may employ other diversity parameters and combinations thereof, including (but not limited to) polarization processing and code-space processing.

MIMO systems have been shown to significantly increase the bandwidth efficiency while retaining the same transmit power budget and bit-error-rate (BER) performance relative to a single input, single output (SISO) system. Similarly, for a given throughput requirement, MIMO systems require less transmission power than SISO systems. MIMO technology is useful for enabling exceptionally high bandwidth efficiency. However, many spatial-multiplexing techniques require rich scattering. Increased path loss and poor scattering are major problems for MIMO systems operating above 2.4 GHz. For these reasons, lower (e.g., cellular) frequencies are often preferred for MIMO applications. However, some MIMO benefits can also be achieved at higher frequencies.

Figure 1B:
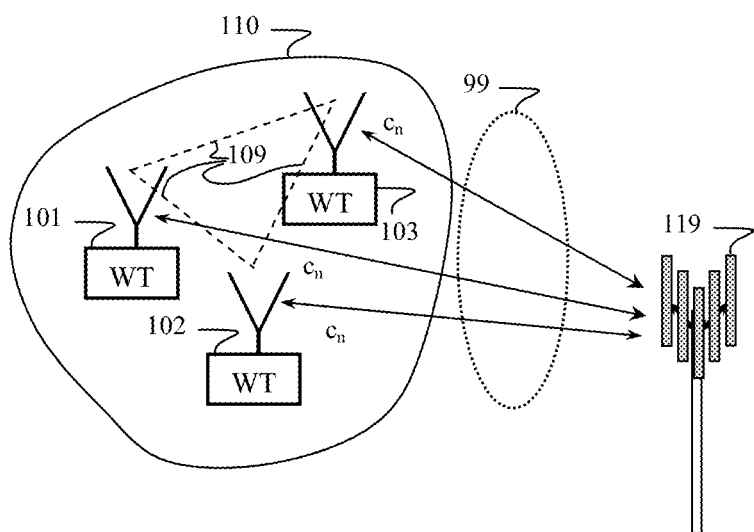
FIG. 1B illustrates an embodiment of the invention in which transmitted and/or received data between a WLAN group and a WWAN terminal occupies parallel, redundant channels $c_n$.

FIG. 1B illustrates an embodiment of the present invention in which transmitted and/or received data between the WLAN group 110 and the WWAN terminal 119 occupies parallel, redundant channels $c_n$. This approach is distinct from typical cooperative-diversity implementations in which WWAN data transmissions are conveyed over a plurality of orthogonal channels. Rather, each of the WTs 101-103 transmits and/or receives on a common channel $c_n$. This enables many well-known types of array processing to be performed.

The WLAN group 110 may function as either or both a transmitting array and a receiving array. The signal received at an antenna array is a noisy superposition of the n transmitted signals:

$$y(n) = \sqrt{\frac{E_s}{M_t}} Hs(n) + v(n)$$

where $\{s(n)\}_{n=0}^{N-1}$ is a sequence of transmitted vectors, $E_s$ corresponds to the transmit energy assuming that $E_{sn}\|S_n\|=1$ for n=1, ..., $M_t$, v(n) represents AWGN with zero mean and variance, and H is an $M_r \times M_t$ matrix channel (where $M_r$ is the number of receiver elements and $M_t$ is the number of transmitter elements), which is assumed constant over N symbol periods. The nominal rank of a rational matrix H is the order of the largest minor of H that is not identically zero, such as shown in T. Kailath, Linear Systems, Prentice-Hall, Inc., 1980, (especially Sec. 6.5), which is incorporated by reference.

Channel characterization involves finding a set of channel realizations (e.g., functions) that indicate channel quality with respect to some performance metric (e.g., error probability or asymptotic criteria). In the MIMO channel, several variables contribute to the channel quality (and thus, to the optimization of channel quality), including the choice of space-time codes, receiver-terminal selection, and receiver algorithm(s) employed.

In one embodiment of the invention, a subset of WTs in a WLAN group may be selected such as to provide optimal WWAN transmission and/or reception within at least one predetermined constraint, such as an optimal or maximum number of active WWAN transceivers within the WLAN group. Such predetermined constraints may be established to optimize some combination of WWAN link performance and resource use within the WLAN group. In one embodiment, WTs experiencing the best WWAN channel conditions may be selected. Techniques employing antenna selection, such as may be used for diversity processing with antenna arrays, may be used in embodiments of the present invention. In one aspect of the invention, resource conservation may focus on WT battery power, MIMO processing complexity, and/or WLAN bandwidth.

Certain embodiments of the invention may distinguish between circuit power (e.g., power used to perform signal processing) versus transmission power. Other embodiments of the invention may provide consideration for the total battery power (e.g., processing power plus transmission power) budget, such as to provide power (e.g., battery usage) load balancing between WTs. Thus, embodiments of the invention may optimize a balance of signaling parameters, including (but not limited to) transmission power, channel-coding (and decoding) complexity, modulation, signal processing and the complexity associated with cooperative array processing parameters (e.g., number of active array elements, number of channels, number of WTs employed to perform signal processing, number of WTs in a WLAN group, type of array-processing operations, etc.).

Any combination of various channel-characterization functions may be employed as a measure of link performance. Example functions including, but not limited to, the following may be employed. Possible functions include the average signal strength:

$$P(H) = \frac{1}{N} \sum_{n=0}^{N-1} \|H^{(n)}\|_F^2$$

the average mutual information:

$$\bar{I}(H) = \frac{1}{N} \sum_{n=0}^{N-1} \log \det\left(I_{M_r} \frac{E_s}{N_o M_t} H^{(n)} H^{(n)H}\right)$$

and the normalized average mutual information:

$$\bar{I}(H) = \frac{1}{N} \sum_{n=0}^{N-1} \log \det\left(I_{M_r} + \frac{E_s}{N_o} \frac{1}{\alpha} H^{(n)} H^{(n)H}\right) \text{ where}$$

$$\alpha = \frac{1}{NM_t M_r} \sum_{n=0}^{N-1} \|H^{(n)}\|_F^2$$

is an estimate of the path loss.

Theoretical capacity in a MIMO channel is typically expressed as:

$$C = \log_d \det[I_{M_r} + \rho/M_t HH^*]$$

where $\rho$ is the average SNR.

A preferred embodiment of the invention may employ error-correcting codes to add structured redundancy to the information bits. This can be done to provide diversity, such as temporal diversity, spatial diversity, and/or frequency diversity. Embodiments of the invention may employ spreading codes, which are well known in the art. In addition to collaborative MIMO operations, the WTs may engage in collaborative decoding. In particular, a WLAN group may be provided with functionality that directs the WTs to coordinate WWAN information exchange and decoding via the WLAN.

In yet another embodiment of the invention, a WWAN terminal may be adapted to receive channel information (and/or even received data) from WTs, perform array-processing (e.g., MIMO) computations, and then upload the resulting array-processing weights to the WTs. The WTs may simply apply the weights to their transmitted and/or received WWAN signals, and perform any other related operations, such as combining.

Figure 1C:
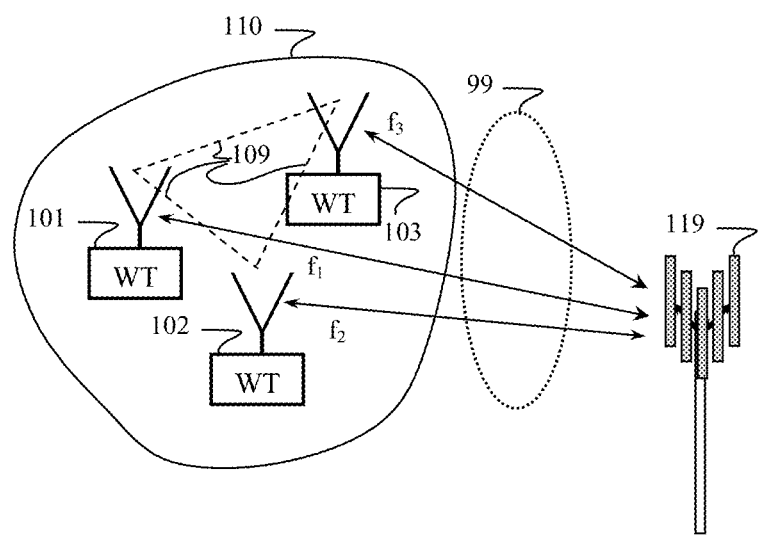
FIG. 1C illustrates an embodiment of the invention in which a WLAN group comprising a plurality of Wireless Terminals (WTs) is adapted to communicate with at least one WWAN node.

FIG. 1C illustrates a WLAN group 110 comprising a plurality of WTs 101-103 adapted to communicate with at least one WWAN node 119. A WWAN channel 99 expresses distortions, interference, and noise that affect WWAN transmissions between the WTs 101-103 and the WWAN node 119. Channel estimation characterizes propagation characteristics (e.g., multipath, shadowing, path loss, noise, and interference) in the WWAN channel.

In one embodiment of the invention, a given WWAN transmission is separated into spectral components (such as denoted by $f_1$, $f_2$, and $f_3$) by the WLAN group 110. For example, each of the WTs 101-103 may be adapted to receive predetermined spectral components $f_1$, $f_2$, and $f_3$ of a given transmission intended for a particular WT. Alternatively, each of the WTs 101-103 may be adapted to transmit one or more associated predetermined spectral components to the WWAN node 119.

The selection of spectral components $f_1$, $f_2$, and $f_3$ and their association with particular WTs 101-103 is typically performed to optimize WWAN system performance relative to the current WWAN channel 99. For example, since the frequency-dependent fading profile in a scattering-rich environment tends to be unique for each spatially separated WT 101-103 channel, the spectral components $f_1$, $f_2$, and $f_3$ are preferably selected to minimize the effects of deep fades and/or interference. Spectral-component selection may be selected and/or adapted to optimize one or more WWAN link-performance metrics, including, but not limited to, SNR, BER, PER, and throughput. Spectral-component selection may be performed to achieve other objectives, such as to distribute processing loads across the WLAN group 110.

The spectral components $f_1$, $f_2$, and $f_3$ may be characterized by overlapping or non-overlapping frequency bands. Spectral components $f_1$, $f_2$, and $f_3$ may each include continuous or discontinuous (e.g., frequency interleaved) frequency-band components. Spectral components $f_1$, $f_2$, and $f_3$ may comprise similar or different bandwidths. Furthermore, the spectral components $f_1$, $f_2$, and $f_3$ may include gaps or notches, such as to notch out interference or deep fades. Accordingly, an aggregate signal derived from combining the spectral components $f_1$, $f_2$, and $f_3$ may include gaps or notches.

WWAN communication signals may include multicarrier (e.g., OFDM) or single-carrier signals. In the case of single-carrier signals, the WTs 101-103 can be adapted to perform frequency-domain synthesis and/or decomposition, such as described in published patent appl. nos. 20040086027 and 20030147655, which are hereby incorporated by reference in their entireties.

Figure 1D:
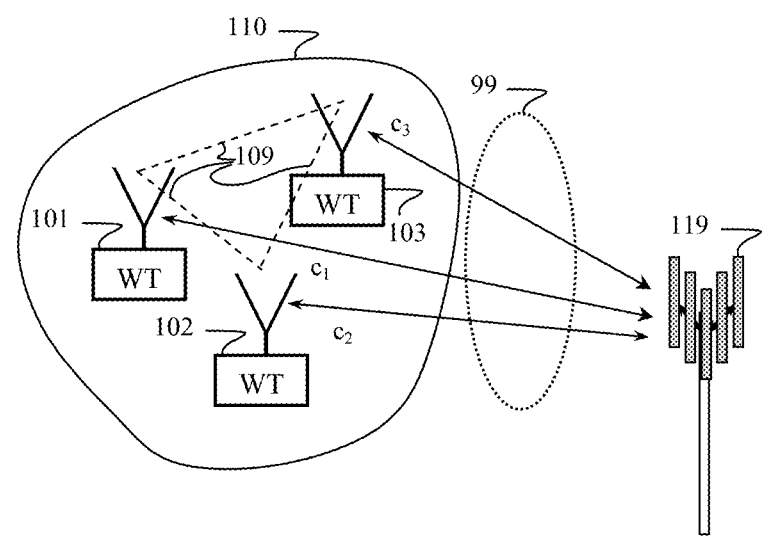
FIG. 1D illustrates an embodiment of the invention in which communications between a WWAN node and a plurality of WTs are characterized by different, yet complementary, code spaces $c_1$, $c_2$, and $c_3$.

FIG. 1D illustrates a similar communication-system embodiment to that shown in FIG. 1C, except that the transmissions between the WWAN node 119 and the WTs 101-103 are characterized by different, yet complementary, code spaces $c_1$, $c_2$, and $c_3$. In this case, the term complementary means that the coded transmissions corresponding to the code spaces $c_1$, $c_2$, and $c_3$ can sum to produce at least one predetermined WWAN coded data sequence. This may be a weighted sum due to the given channel conditions. A predetermined WWAN coded data sequence may employ a code that would ordinarily (in view of the prior art) be employed in whole. That is, it would not ordinarily be partitioned into sub-codes to be transmitted by different transmitters or received by different receivers.

In one embodiment of the invention, the code spaces $c_1$, $c_2$, and $c_3$ correspond to direct-sequence codes, such as may be used to provide for spreading and/or multiple access. A superposition of signals transmitted across the code spaces $c_1$, $c_2$, and $c_3$ may provide at least one predetermined WWAN coded data sequence received by at least one WWAN node 119. Similarly, a superposition of signals received by the WTs 101-103 and mapped onto the code spaces $c_1$, $c_2$, and $c_3$ may provide at least one predetermined WWAN coded data sequence that would ordinarily (in view of the prior art) be intended for a single WT. Preferred embodiments of the invention may provide for channel corrections (e.g., pre-distortion and/or receiver-side channel compensation) by either or both the WLAN group 110 and the WWAN node 119. Accordingly, the code spaces $c_1$, $c_2$, and $c_3$ may be adapted to account for channel conditions.

In another embodiment of the invention, the code spaces $c_1$, $c_2$, and $c_3$ may correspond to direct-sequence codes having predetermined spectral characteristics. It is well known that different time-domain data sequences may be characterized by different spectral distributions. Accordingly, embodiments of the invention may provide for selecting complementary codes $c_1$, $c_2$, and $c_3$ having predetermined spectral characteristics with respect to WWAN channel conditions affecting the links between the WTs 101-103 and the WWAN node 119. Thus, the codes $c_1$, $c_2$, and $c_3$ may be selected according to the same criteria employed for selecting the spectral components $f_1$, $f_2$, and $f_3$.

Figure 1E:
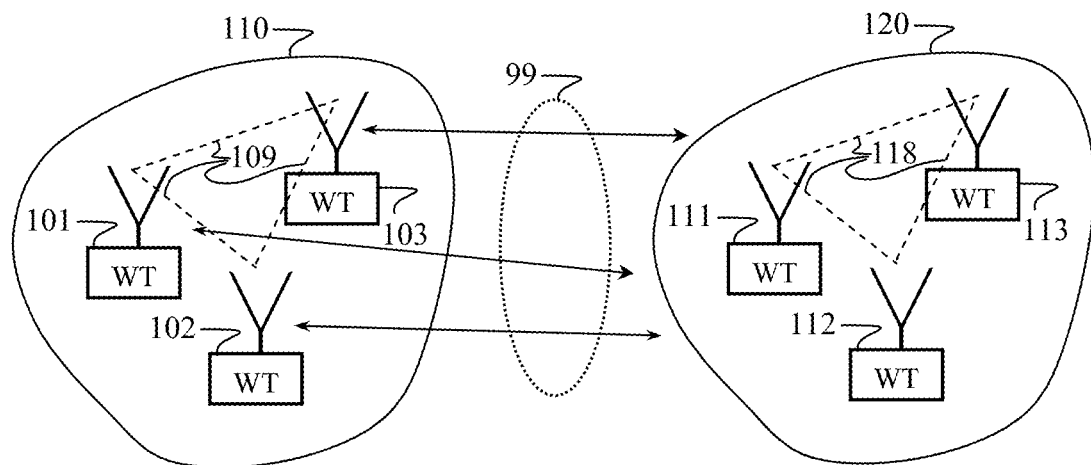
FIG. 1E illustrates an embodiment of the invention in which a first WLAN group is adapted to communicate with a second WLAN group via at least one WWAN channel or network.

FIG. 1E illustrates an embodiment of the invention in which a first WLAN group 110 (such as comprising WTs 101-103 connected via WLAN 109) is adapted to communicate with a second WLAN group 120 (such as comprising WTs 111-113 connected via WLAN 118) via WWAN channel 99. Applications of this embodiment may be directed toward peer-to-peer and multi-hop networks. Specifically, antenna-array processing (e.g., MIMO operations) may be performed by both WLAN groups 110 and 120. Each WLAN group (such as WLAN groups 110 and 120) may function as a single node in an ad-hoc network, a peer-to-peer network, or a multi-hop network. For example, any communication addressed to (or routed through) a particular node (such as one of the WTs 101-103) may be advantageously processed by one or more of the WTs 101-103 in the WLAN group 110. In one embodiment, each active WT 101-103 in the WLAN group 110 may be responsive to communications addressed to itself and to at least one other WT 101-103 in the WLAN group 110.

The WLAN 109 may be used to inform individual WTs 101-103 which node address(es) (or multiple-access channel assignments) to be responsive to. Similarly, the WLAN 109 may convey information to WTs 101-103 in order to spoof node addresses and/or multiple-access information and otherwise help WTs 101-103 assume channelization information related to a particular WT identity prior to transmitting signals into the WWAN. Thus, the WLAN 109 can be used to assist in synchronizing WT interactions with the WWAN. The functionality of providing for sharing WWAN-access information between WTs 101-103 may be coordinated and controlled with respect to cooperative-array (e.g., MIMO) processing.

Figure 1F:
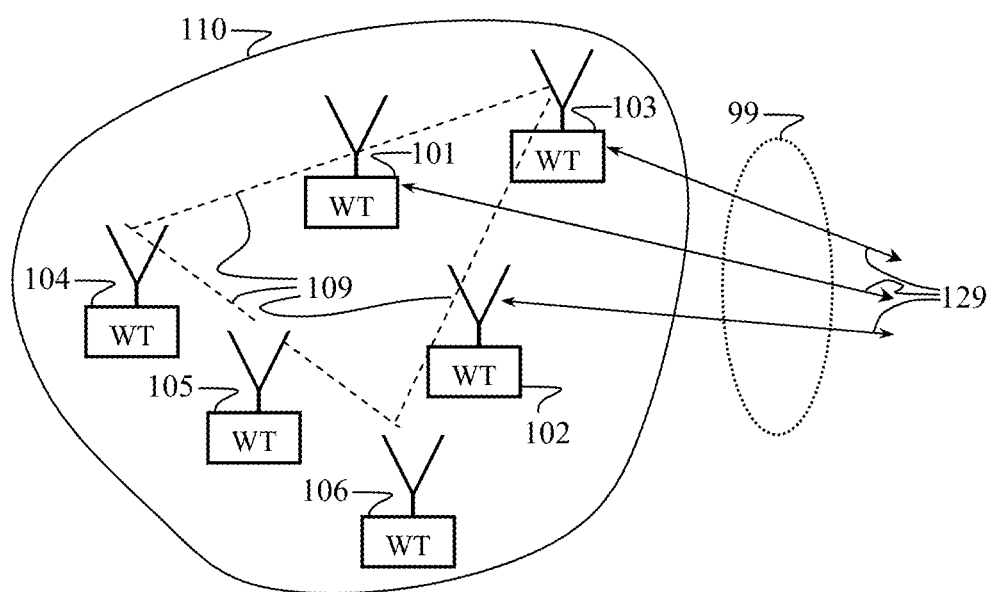
FIG. 1F shows an embodiment of the invention wherein a WLAN group includes a plurality of WWAN-active WTs and at least one WWAN-inactive WT.

FIG. 1F shows an embodiment of the invention wherein a WLAN group 110 includes a plurality of WWAN-active WTs 101-103 and at least one WWAN-inactive WT, such as WTs 104-106. The WWAN-active WTs 101-103 may be configured to directly transmit and/or receive WWAN communication signals 129. WWAN-inactive WTs 104-106 are defined as WLAN-connected terminals that do not directly communicate with the WWAN. Rather, the WWAN-inactive WTs 104-106 may be in a sleep or standby mode.

In a preferred embodiment of the invention, signals routed to and from a particular WT 101-103 may be provided with beam-forming weights that allow for phased-array and/or sub-space processing. Calculation of the weights may be facilitated via distributed computing (e.g., as a load-balancing measure) across a plurality of the WTs (101-106). This allows the WLAN group 110 to scale the effective throughput of the WWAN link and coordinate system throughput with local area load balancing. In particular, the efficiency of the WWAN link is proportional to the smaller of the number of array elements at the WWAN terminal (not shown) and the number of WWAN-active transceiver antennas linked by the WLAN 109. When an equal number N of antennas is employed on both sides of the link, up to an N-fold increase in the link throughput is possible. Channel coding can be employed to exchange this increase for improved probability-of-error performance, increased range, and/or lower transmission power.

Although the capacity of a MIMO channel increases with the number of antennas employed at both ends of the link, the complexity of the transmission and reception algorithms increases accordingly. For example, the sphere decoder has a typical complexity of $O(M_T^6)$, where $M_T$ is the number of transmitting antennas, and V-Blast has a typical complexity of $O((M_R M_T)^3)$, where $M_R$ and $M_T$ are respectively the number of receiving and transmitting antennas. However, the computational power increases only linearly with respect to the number of WTs (assuming each WT has identical processing capability). Thus, the aggregate processing power of the WTs may determine the maximum number of active antennas that a WLAN group 110 can support.

One solution to the disparity between required processing power and the number of WT processors in a given WLAN group 110 is to ensure that the total number of WTs exceeds the number of MIMO channels in the group 110. This approach enables at least two significant processing advantages:

1) The processing load may be spread over a larger number of mobile-terminal processors, and
2) A form of antenna-switching diversity can be used to optimize performance and throughput in the MIMO channel.

Antenna switching is a well-known technique that switches between various antennas and selects ones having the best signal outputs. This can be done to reduce correlation between antennas, thereby improving MIMO performance. Antenna switching is described in G. J. Foschini, M. J. Gans, "On limits of wireless communication in a fading environment when using multiple antennas," *Wireless Personal Communications*, vol. 6, no. 3, pp. 311-335, March 1998, which is incorporated by reference. In some embodiments of the invention, WTs having the most favorable WWAN channel characteristics may be selected to improve MIMO performance without any increase in processing complexity.

In some embodiments of the invention, one or more WWAN-inactive WTs 104-106 may be employed for WLAN-based functions, such as (but not limited to) WLAN network control, distributed-computing applications, and WWAN-interface control. For example, WLAN network control may include any of the well-known network-control functions, such as terminal identification, authentication, error correction, routing, synchronization, multiple-access control, resource allocation, load balancing, power control, terminal-state management, hand-offs, etc.

The WLAN 109 may employ distributed computing across a plurality of the WTs. Distributed computing may be employed simply to achieve increased processing power. Alternatively, distributed computing may include other objectives, such as balancing computational processing loads or balancing power consumption across the WTs 101-106 in the WLAN group 110. Computational loads on the WLAN group can potentially include any WWAN-related computations, such as WWAN channel estimation, WWAN channel compensation, diversity combining, WWAN channel coding/decoding, and cooperative array processing (e.g., MIMO weight calculation, interference cancellation, multi-user detection, matrix operations, and other smart antenna array processing operations).

WWAN-interface control may include distributing WWAN data and control information between the WTs 101-106. In one exemplary embodiment of the invention, at least one of the WTs 101-106 comprises a data source that distributes its data to at least one other WT 101-106 for transmission into the WWAN. In a similar embodiment of the invention, received WWAN signals intended for a particular WT 101-106 are received by a plurality of WWAN-active WTs 101-103. The received WWAN signals may optionally be processed by one or more WTs 101-106 prior to being routed to the intended WT 101-106. Accordingly, WWAN channel-access information may be routed to a plurality of WWAN-active WTs 101-103 such that they function together as a single WT 101-106.

The determination of which WTs 101-106 are active is typically performed by decision processing within the WLAN group 110 that determines which WTs 101-106 have the highest quality WWAN channel(s). The number of WWAN-active WTs (such as WTs 101-103) may be determined by one or more factors, including WT channel quality, array-processing complexity, available computational resources within the WLAN group 110, load balancing, and information-bandwidth requirements. In an alternative embodiment of the invention, the WWAN assigns cooperative channel-access information to the WTs 101-103 and may optionally determine which WTs 101-106 are active.

Some embodiments of the invention may take into consideration not only the MIMO complexity at the WTs, but also the added complexity associated with distributing the computational loads over WTs in a given WLAN group. Both MIMO and distributed computing overheads can be characterized as a function of the number of WTs in a WLAN group. Furthermore, the information bandwidth of a given WLAN channel limits the rate of information exchange between WTs. Accordingly, local channel conditions within the WLAN may affect throughput and range, and thus limit the number of WTs within the WLAN group. Either the WLAN capacity or the computational capability of each WT may set a practical limit on the number of WTs in a WLAN group and the overall frequency-reuse factor.

Another important factor that can impact the WLAN group size is the channel rate-of-change, which may be due to motion of the WTs and/or other objects in the WWAN environment. In particular, rapidly changing channel conditions may necessitate frequent updates to the MIMO computations, thus increasing the computational load on WLAN group and potentially increasing the required data transfer across the WLAN. Similarly, local channel conditions may dictate the flow of data if distributed computing is employed.

MIMO systems experience substantial degradation in data transfer rates in mobile channels. Time-varying multipath-fading profiles commonly experienced in a mobile wireless network exhibit deep fades that often exceed 30 dB. Commercial viability of some embodiments of the present invention requires the ability to tolerate a rapidly changing channel. A promising approach to this problem is to employ diversity to reduce the channel rate-of-change. In a wide-band system, or equivalently, in a system comprised of a number of narrowband subcarriers distributed (e.g., interleaved) over a wide frequency band, deep fades affect only a portion of the total channel bandwidth. Therefore, frequency and/or spatial diversity may be employed to reduce the likelihood of deep fades in a multipath environment. Similarly, alternative forms of diversity may be employed. In a mobile environment, this translates into reducing the channel rate-of-change.

Figure 1G:
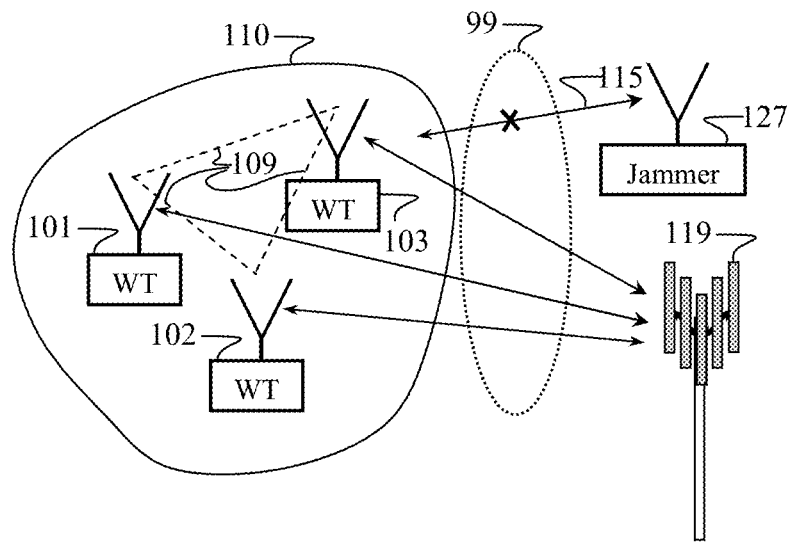
FIG. 1G illustrates a cooperative beam-forming embodiment of the invention that functions in the presence of a desired WWAN terminal and a jamming source.

FIG. 1G illustrates a cooperative beam-forming embodiment of the invention that functions in the presence of a desired WWAN terminal 119 and an external interference source (or jammer) 118. WTs 101-103 in a WLAN group 110 may coordinate their received aggregate beam pattern(s) to null out a jamming signal 115. Array-processing operations performed on signals received from the WTs 101-103 may take the form of phased-array processing, which minimizes the array's sensitivity to signals arriving from one or more angles. Alternatively, array processing may employ baseband (or intermediate-frequency) interference cancellation. Similarly, beam-forming operations may be employed to cancel emissions transmitted toward one or more terminals (such as jammer 118).

Figure 1H:
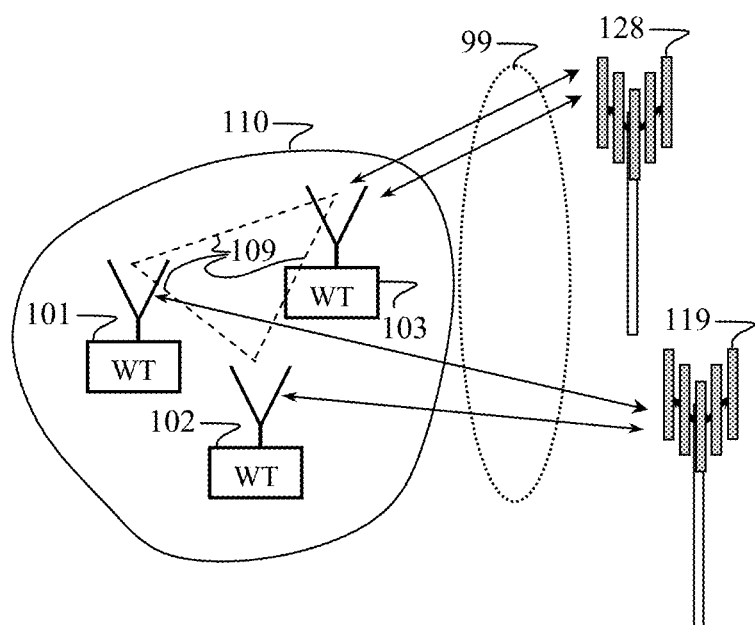
FIG. 1H illustrates a cooperative beam-forming embodiment of the invention that functions in the presence of a plurality of desired WWAN terminals.

FIG. 1H illustrates a cooperative beam-forming embodiment of the invention configured to function in the presence of a plurality of desired WWAN terminals 119 and 127. In one embodiment of the invention, the WWAN terminals 119 and 127 may be common to a particular WWAN, and the configuration illustrated in FIG. 1H may include a soft hand-off in which redundant transmissions are transmitted between the WLAN group 110 and the WWAN terminals 119 and 127. In this case, the WLAN group may be distributed geographically over a plurality of WWAN sectors or cells. In one aspect of the invention, the WLAN group 110 may adapt its connectivity with the WWAN to transition to the cell or sector offering the optimal aggregate WWAN channel quality. Accordingly, the WLAN group may adapt its selection of WWAN-active WTs in response to a hand off.

In another embodiment of the invention, the WLAN group 110 may employ a first WWAN connection (such as illustrated by a connection between WTs 101 and 102, and WWAN terminal 119) and a second WWAN connection (such as illustrated by a connection between WT 103 and WWAN terminal 127) to transmit and/or receive one or more data streams. The WLAN group 110 may employ a plurality of WWAN user channels in a given WWAN. Similarly, the WLAN group 110 may employ connections to a plurality of different WWANs.

Figure 1I:
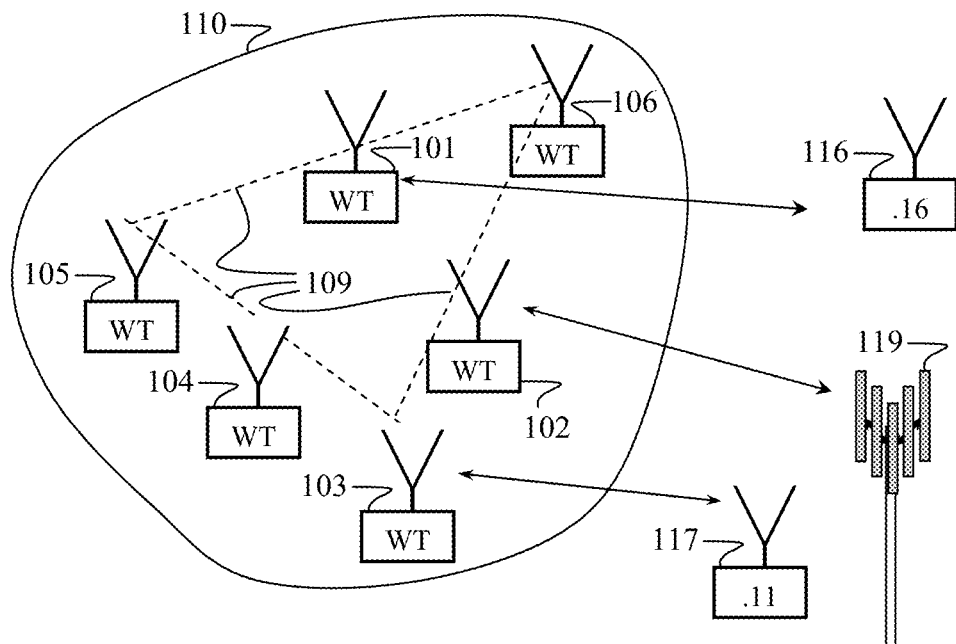
FIG. 1I illustrates an embodiment of the invention adapted to provide a plurality of WTs in a WLAN group with access to a plurality of WWAN services.

FIG. 1I illustrates an embodiment of the invention that provides a plurality of WTs 101-106 in a WLAN group 110 with access to a plurality of WWAN services (i.e., WWANs). For example, WT 101 is provided with a communication link with an IEEE 802.16 access-point terminal 116 in an IEEE 802.16 network, WT 102 maintains access capabilities to a 3G-cellular terminal 119, and WT 103 has connectivity to an IEEE 802.11 access point 117. WLAN connectivity 109 is adapted to enable any of the WTs 101-106 in the WLAN group 110 to access any of the plurality of WWAN (802.16, 3G, and 802.11) services.

The WLAN 109 may include a WWAN-access controller (not shown), which may take the form of WLAN-control software residing on a physical device, such as one or more WTs 101-106. Connectivity of the WTs 101-106 to the available WWAN services may be performed with respect to a combination of technical rules and business rules. For example, WWAN access is typically managed using technical rules, such as network load balancing, power conservation, and minimizing computational processing loads. However, WWAN access can also be influenced by business rules, such as enabling a predetermined cost/service ratio for individual WTs 101-106. For example, the WWAN-access controller (not shown) can anticipate the economic cost of particular WWAN services to the user, as well as user communication needs, when assigning WWAN access to individual WTs 101-106. Each WT 101-106 may provide the WWAN-access controller (not shown) with a cost tolerance, which can be updated relative to the type of communication link desired. For example, high-priority communication needs (such as particular voice communications or bidding on an online auction) may include permissions to access more expensive WWAN connections in order to ensure better reliability.

The overall goal of WWAN access may be to achieve optimal connectivity with minimum cost. Accordingly, WWAN-access algorithms may include optimization techniques, including stochastic search algorithms (like multi-objective genetic algorithms). Multi-objective optimization are well known in the art, such as described in E. Zitzler and L. Thiele, "Multiobjective evolutionary algorithms: A comparative case study and the strength pareto approach," *IEEE Tran. on Evol. Comput.*, vol. 3, no. 4, November 1999, pp. 257-271 and J. D. Schaffer, "Multiple objective optimization with vector evaluated genetic algorithms," *Proceedings of 1st International Conference on Genetic Algorithms*, 1991, pp. 93-100, both of which are incorporated by reference.

A WWAN-access controller (not shown) preferably ensures an uninterrupted session when transitioning from one WWAN to another. In particular, the transition between different WWANs should be invisible to the user. This requires that the WWAN-access controller (not shown) be adapted to store user state information (e.g., save browser pages or buffer multimedia data streams). Furthermore, back-end systems may preferably be employed to manage cooperative WWAN access in order to consolidate different WWAN-access charges into a single bill for the user.

Figure 1J:
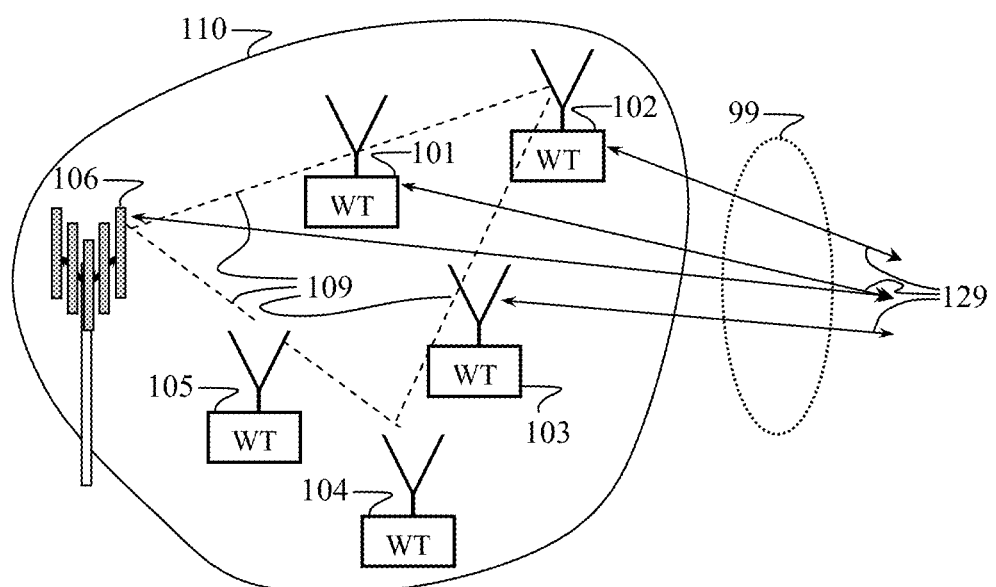
FIG. 1J illustrates an embodiment of the invention in which a WLAN group includes at least one WWAN terminal.

In FIG. 1J, a plurality of WTs 101-106 in a WLAN group 110 includes at least one WWAN terminal 106. The WTs 101-105 may contribute beam-forming capabilities to the WWAN terminal 106, such as to increase range, increase spatial reuse, reduce transmission power, and/or achieve any of other various beamforming objectives.

In one embodiment of the invention the WTs 101-105 function as lens for WWAN signals transmitted and received by the WWAN terminal 106. For example, the WTs 101-106 may collect received WWAN signals and then focus retransmitted WWAN signals at the WWAN terminal 106. Similarly, the WTs 101-105 may assist in the transmission of WWAN signals from the WWAN terminal 106 to one or more remote sources. In essence, the WTs 101-105 may function like a radio relay, but with directionality and focusing capabilities. In this embodiment, the WLAN connectivity of WTs 101-105 with the WWAN terminal 106 may not be necessary.

In another embodiment of the invention, one or more of the WTs 101-106, such as WWAN terminal 106, may be adapted to process the majority (or entirety) of necessary beam-forming computations. In this case, WT 106 is designated as a computer-processing terminal. The computer-processing terminal 106 is adapted to include specific computational resources for processing WWAN signals received by other WTs (such as WTs 101-103), which are then relayed via the WLAN 109 to the computer-processing terminal 106. Similarly, the computer-processing terminal 106 may be adapted to perform signal-processing operations associated with WWAN transmission. Computational operations associated with other WWAN signal-processing operations (e.g., coding, decoding, channel estimation, network-access control, etc.) may be provided by the computer-processing terminal 106.

Figure 2A:
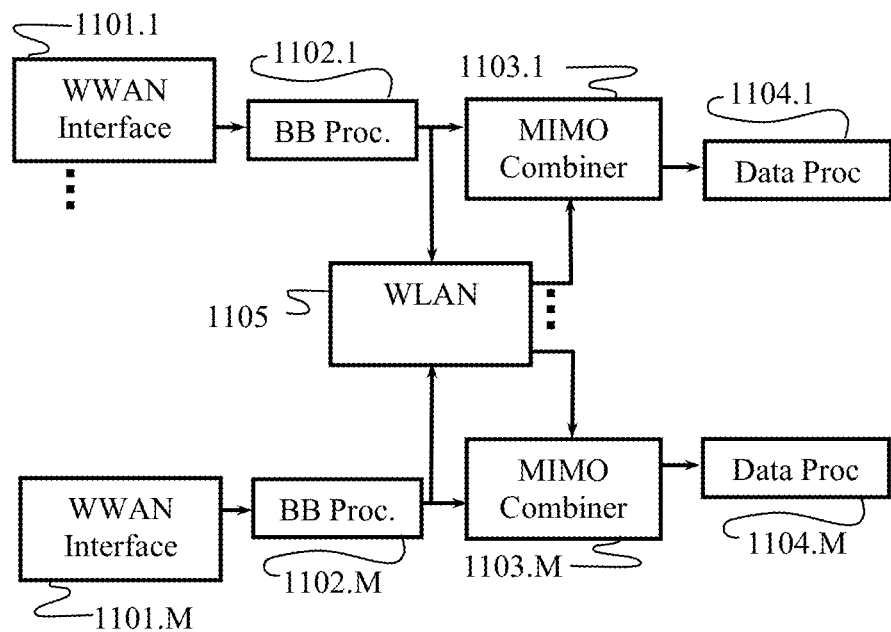
FIG. 2A illustrates a functional receiver embodiment of the invention that may be realized in both method and apparatus embodiments.

FIG. 2A illustrates a functional embodiment of the invention that may be realized in both method and apparatus embodiments. A plurality M of WWAN Interfaces 1101.1-1101.M is provided for coupling WWAN signals to and/or from at least one WWAN. In one functional embodiment, WWAN Interfaces 1101.1-1101.M may include WWAN transceivers adapted to convert received WWAN signals into received baseband signals. A plurality of WWAN baseband processors 1102.1-1102.M are optionally provided for performing baseband processing (such as, but not limited to, channel compensation, A/D conversion, frequency conversion, filtering, and demultiplexing) on the received baseband signals. Alternatively, the function of the WWAN baseband processors 1102.1-1102.M may be performed by the WWAN Interfaces 1101.1-1101.M.

Baseband outputs from the WWAN baseband processors 1102.1-1102.M are coupled into a plurality of array processors, such as MIMO combiners 1103.1-1103.M. In a MIMO channel, the received WWAN signals (and thus, the baseband outputs) are characterized by a plurality of overlapping (i.e., interfering) signals. Although MIMO combiners 1103.1-1103.M are shown, any type of array processor may be employed. The number of array processors may be less than, equal to, or greater than the number M of WWAN Interfaces 1101.1-1101.M. Baseband outputs may also be coupled into a WLAN 1105, which is coupled to the plurality of MIMO combiners 1103.1-1103.M. Each MIMO combiner 1103.1-1103.M may be adapted to receive baseband outputs from two or more baseband processors 1102.1-1102.M wherein at least one of those baseband outputs is coupled to the MIMO combiner 1103.1-1103.M via the WLAN 1105.

A particular $m^{th}$ MIMO combiner 1103.m need not process data from a corresponding ($m^{th}$) WWAN Interface 1101.m. Rather, the $m^{th}$ MIMO combiner 1103.m may process baseband signal outputs from a plurality of WWAN Interfaces 1101.p {p=1, . . . , M, where p≠m}.

The WLAN 1105 comprises at least one WLAN channel between at least one baseband output (e.g., baseband processor 1102.1-1102.M outputs) and at least one array processor, such as the MIMO combiners 1103.1-1103.M. The WLAN 1105 may include WLAN interfaces (not shown) and associated WLAN-control hardware and/or software (not shown).

The MIMO combiners 1103.1-1103.M may be adapted to separate the overlapping signals and output at least one desired transmission therefrom. Outputs of the MIMO combiners 1103.1-1103.M are optionally processed by secondary data processors 1104.1-1104.M, which may provide coupling into the WLAN 1105. The secondary data processors 1104.1-1104.M may be adapted to perform demodulation, error-correction decoding, data formatting, and/or other related baseband-processing functions.

In some embodiments of the invention, MIMO combiner 1103.1-1103.M outputs may be coupled via the WLAN 1105 to other MIMO combiners 1103.1-1103.M and/or secondary data processors 1104.1-1104.M. For example, embodiments of the invention may employ an iterative cancellation process, such as successive interference cancellation (which is well-known in the art), involving the use of strongest-signal estimates, and then next-strongest-signal estimates to cancel known interference in weaker signals. Alternatively, embodiments may employ parallel cancellation.

Figure 2B:
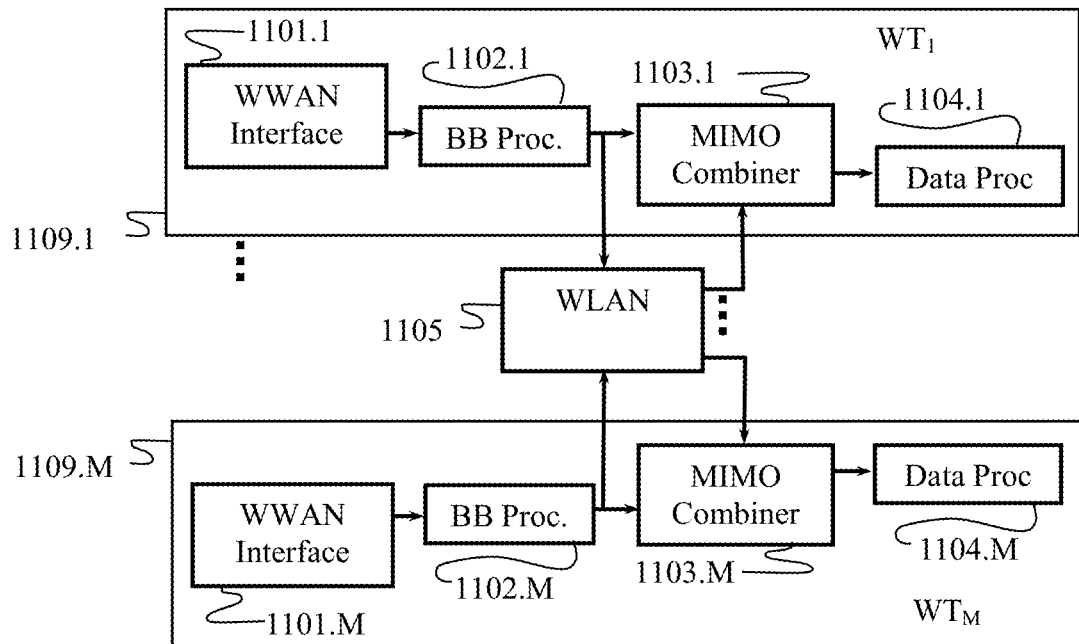
FIG. 2B illustrates a functional receiver embodiment of the invention that may be realized in both method and apparatus embodiments.

FIG. 2B illustrates an embodiment of the invention including a plurality M of WTs 1109.1-1109.M, each comprising a corresponding combination of a WWAN Interface 1101.1-1101.M, an optional WWAN baseband processor 1102.1-1102.M, a combiner (such as a MIMO combiner 1103.1-1103.M), and a secondary data processor 1104.1-1104.M. The WTs 1109.1-1109.M are coupled together by a WLAN 1105, which is configured to convey data between the WTs 1109.1-1109.M in order to enable cooperative antenna-array processing.

A WT, such as any of the WTs 1109.1-1109.M, includes any system or device provided with communicative connectivity means to a WLAN 1105. Two or more WTs 1109.1-1109.M are preferably provided with WWAN interfaces, such as WWAN Interface 1101.1-1101.M. A plurality of WTs 1109.1-1109.M may share at least one WLAN 1105. In one embodiment of the invention, individual WTs 1109.1-1109.M may share the same WWAN service. This enables the WLAN group 110 to perform either or both transmit beam-forming and receive beam-forming (i.e., combining) operations.

In another embodiment of the invention, WTs 1109.1-1109.M may have connections to different WWANs and/or WWAN services. This enables the WLAN group 110 to achieve WWAN-service diversity. One or more WTs 1109.1-1109.M may optionally be capable of accessing multiple WWAN services. For example, many cellular handsets are provided with multi-mode capabilities, which give them the ability to access multiple WWANs. Some of the WTs 1109.1-1109.M may have no WWAN service. For example, one or more WTs 1109.1-1109.M may be out of range, in a WWAN dead spot, in an inactive WWAN state, or configured only to communicate via the WLAN 1105. WTs 1109.1-1109.M include, but are not limited to, cell phones, radio handsets, pagers, PDAs, wireless sensors, RFID devices, vehicle radio communication devices, laptop computers with wireless modems, wireless network access points, wireless routers, wireless switches, radio repeaters, transponders, and devices adapted to include satellite modems.

A WLAN group 110 may be adapted to perform any of various types and combinations of diversity and MIMO beam-forming. Three commonly used linear diversity-combining techniques include switched (or selection) combining, maximal ration combining (MRC), and equal gain combining (EGC). Other combining techniques may be employed. The impact of using diversity may be expressed by a probability distribution p(γ) of the SNR γ at the output of a combining network. For switched diversity, wherein the combiner switches to the diversity branches (e.g., WTs) having the strongest signal, p(γ) is given by:

$$p(\gamma) = \frac{L}{\Gamma} e^{-\gamma/\Gamma} [1 - e^{-\gamma/\Gamma}]^{L-1}$$

where Γ is the average SNR for each diversity branch and L is the number of diversity branches. MRC weights branches (e.g., WT signals received from the WWAN) having better SNR more heavily (i.e., with greater-magnitude weights) than branches having poorer SNR. The p(γ) for MRC is given by:

$$p(\gamma) = \frac{\gamma^{l-1} e^{-\gamma/\Gamma}}{\Gamma^L (l-1)!}$$

For EGC, p(γ) is given by:

$$p(\gamma) = \frac{L}{a\Gamma} e^{-\gamma/a\Gamma} [1 - e^{-\gamma/a\Gamma}]^{L-1}$$

where $a = \sqrt{L/1.25}$ for L≥2, and 1 otherwise.

These diversity techniques provide the greatest improvements when the branches are uncorrelated.

Adaptive arrays (or smart antennas) may include antenna systems that automatically adjust to achieve some predetermined performance criterion, such as maximizing the signal to interference (S/I) ratio, SINR, or link margin. Adaptive antenna techniques include switched beam, beam steering, and optimum combining (e.g., a linear spatial filtering approach that employs adaptation to closely match an output signal with a reference signal). A filtering process typically suppresses any artifacts that are not part of the desired incoming signal, including noise and interference.

In an optimum combining system, signals from each WT are down converted to baseband and converted to digital signals in an ADC. Noise associated with the front end of the down converter and other sources is naturally added to the signal. The resulting signal $x_m(k)$ is multiplied by a complex weighting function $w_m(k)$ and summed with similar signals from other WT antenna elements. The resulting sum signal $\Sigma w_m(k) x_m(k)$ is compared with a previously derived (and updated) reference signal (e.g., a training sequence). An error signal e(k) is generated and used to adjust the weight values in order to minimize e(k). The objective is to derive the weighting function $w_m(k)$ that enables the best match between an estimated received signal and the actual transmitted signal. Alternatively, an adaptive WT array may be configured as an analog array wherein amplitude and phase adjustments (i.e., weighting functions) are performed at RF or IF.

In a MIMO communication system, signals transmitted from $M_T$ transmit sources interfere with each other at a receiver comprising the WTs 1109.1-1109.M. Thus, interference cancellation (such as matrix inversion, channel transfer function inversion, and adaptive filtering) may be employed by one or more MIMO combiners 1103.1-1103.M to separate the signals. The received signal is expressed by:

$$y = Hx + n$$

where the received signal, y, is a vector with $M_R$ terms $\{y_i = 1, \ldots, N_R\}$ corresponding to signals received by $M_R$ (where $M_R$ may have a value of 2 to M) receiver elements (i.e., WTs); x represents the transmitted signal, which is a vector having $M_T$ terms $\{x_i = 1, \ldots, M_T\}$ corresponding to signals transmitted by $M_T$ transmitter elements; H is an $M_T \times M_T$ channel-response matrix that characterizes the complex gains (i.e., transfer function, or spatial gain distribution) from the $M_T$ transmission elements to the $M_R$ receive elements; and n represents AWGN having zero mean and zero variance.

In the case where the channel is characterized by flat fading, such as when a narrowband signal is employed (e.g., a sub-carrier of a multi-carrier signal), the elements in matrix H are scalars. The channel-response matrix H may be diagonalized by performing an eigenvalue decomposition of the $M_T \times M_T$ correlation matrix R, where $R=H^H H$. Eigenvalue decomposition is expressed by:

$$R=EDE^H$$

where E is an $M_T \times M_T$ unitary matrix with columns corresponding to the eigenvectors $e_i$ of R, and D is an $M_T \times M_T$ diagonal matrix wherein the diagonal elements are eigenvalues $\lambda_i$ of R. The diagonal elements of D indicate the channel gain for each of the independent MIMO channels. Alternatively, other eigenvalue-decomposition approaches, such as singular value decomposition, may be employed.

The process for diagonalizing the MIMO channel response is initiated by multiplying a data vector d with the unitary matrix E to produce the transmitted vector x: x=Es. This requires the transmitter to have some information corresponding to the channel-response matrix H, or related information thereof. The received vector y is then multiplied with $E^H H^H$ to provide an estimate of data vector s, which is expressed by:

$$\hat{s}=E^H H^H y = E^H H^H HEs + E^H H^H n = Ds + \hat{n}$$

where $\hat{n}$ is AWGN having a mean vector of 0 and a covariance matrix of $\Lambda_n = \sigma^2 D$.

The data vector s is transformed by an effective channel response represented by the diagonal matrix D. Thus, there are $N_s$ non-interfering subchannels wherein each subchannel i has a power gain of $\lambda_i^2$ and a noise power of $\sigma^2 \lambda_i$.

In the case where MIMO processing is performed on a multicarrier signal, or some other wideband signal that is spectrally decomposed into narrowband components, eigenmode decomposition may be performed for each frequency bin $f_n$.

If multicarrier spreading codes are employed (e.g., orthogonal DFT, or CI, codes), the channel-response matrix H can cause inter-symbol interference between spread data symbols, even in a SISO arrangement. Accordingly, the eigenmode decomposition technique described previously is applicable to multicarrier spreading and despreading. In one embodiment of the invention, eigenmode decomposition may be applied across two or more dimensions (e.g., both spatial and frequency dimensions). In another embodiment of the invention, eigenmode decomposition may be applied across a single dimension (e.g., spatial or frequency dimensions). For example, multicarrier spreading codes (for example, orthogonal codes for data multiplexing in a given multiple-access channel) may be generated and processed via eigenmode decomposition.

Any of various water-filling or water-pouring schemes may be employed to optimally distribute the total transmission power over the available transmission channels, such as to maximize spectral efficiency. For example, water-filling can be used to adapt individual WT transmission powers such that channels with higher SNRs are provided with correspondingly greater portions of the total transmit power. A transmission channel, as defined herein, may include a spatial (e.g., a sub-space) channel, a space-frequency channel, or some other channel defined by a set of orthogonalizing properties. Similarly, water filling may be used at a physically connected (i.e., wired) antenna array. The transmit power allocated to a particular transmission channel is typically determined by some predetermined channel-quality measurement, such as SNR, SINR, BER, packet error rate, frame error rate, probability of error, etc. However, different or additional criteria may be employed with respect to power allocation, including, but not limited to, WT battery life, load balancing, spatial reuse, power-control instructions, and near-far interference.

In conventional water filling, power allocation is performed such that the total transmission power $P_T$ is some predetermined constant:

$$P_T = \sum_{j \in K} \sum_{k \in L} P_j(k)$$

where $L=\{1, \ldots, N_s\}$ signifies the available subspaces and $K=\{1, \ldots, N_f\}$ represents the available sub-carrier frequencies $f_n$. The received SNR (expressed by $\psi_j(k)$) for each transmission channel is expressed by:

$$\psi_j(k) = \frac{P_j(k) \lambda_j(k)}{\sigma^2},$$

for $j=\{1, \ldots, N_s\}$ and $k=\{1, \ldots, N_f\}$

The aggregate spectral efficiency for the $N_s N_f$ transmission channels is expressed by:

$$C = \sum_{j=1}^{N_s} \sum_{k=1}^{N_f} \log_2(1 + \psi_j(k))$$

The modulation and channel coding for each transmission channel may be adapted with respect to the corresponding SNR. Alternatively, transmission channels may be grouped with respect to their data-carrying capability. Thus, groups of transmission channels may share common modulation/coding characteristics. Furthermore, transmission channels having particular SNRs may be used for particular communication needs. For example, voice communications may be allocated to channels having low SNRs, and thus, data-carrying capabilities. In some cases, transmission channels that fail to achieve a predetermined threshold SNR may be eliminated. In one embodiment of the invention, water filling is employed such that the total transmission power is distributed over selected transmission channels such that the received SNR is approximately equal for all of the selected channels.

An embodiment of the invention may employ reliability assessment for determining required processing and virtual-array size (i.e., the number of active WTs functioning as WWAN receiver elements). Received bits or symbols that have low reliability need more processing. Bits or symbols with high reliability may be processed with fewer elements (WTs) or provided with lower processing requirements. More information typically needs to be combined for data streams having less reliability and less information may need to be combined for data streams having more reliability. Also, nodes (WTs) with good channel quality may share more information via the WLAN than nodes having poor channel quality. Optimization algorithms, such as water-filling algorithms may be employed in the reliability domain.

Figure 3A:
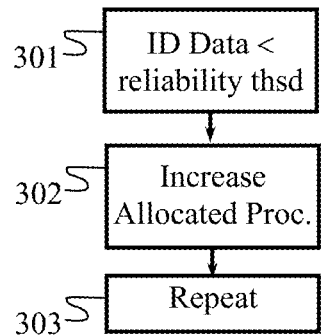
FIG. 3A illustrates an embodiment of the invention in which a WLAN controller for a WLAN group allocates processing resources based on WWAN-link performance.

FIG. 3A illustrates an embodiment of the invention in which a WLAN controller for a WLAN group of WTs first identifies received data streams that have the least reliability (e.g., reliability that is below a predetermined threshold) 301. Then the WLAN controller increases allocated processing (e.g., increases the number of receiver nodes, increases the number of processing nodes, employs a processing approach having higher computational complexity, etc.) 302 to those data streams. Data symbols may be combined from the smallest number of nodes such that the reliability of the sum is maximized, or at least exceeds a predetermined threshold reliability. The processes 301 and 302 may be repeated 303 until a predetermined result is achieved or until there is no more data left for processing.

Figure 3B:
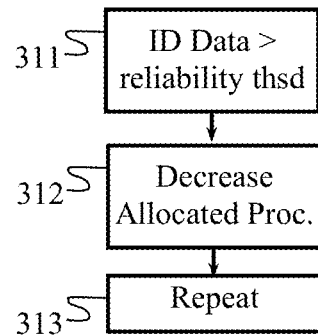
FIG. 3B illustrates an alternative embodiment of the invention in which a WLAN controller for a WLAN group allocates processing resources based on WWAN-link performance.

FIG. 3B illustrates an embodiment of the invention in which a WLAN controller identifies received data streams that have the most reliability, or data streams having reliability that exceeds a predetermined reliability threshold 311. The WLAN controller may decrease allocated processing (e.g., decrease the number of receiver nodes, decrease the number of processing nodes, employ a processing approach having lower computational complexity, etc.) 312 to those data streams. The processes 301 and 302 may be repeated 303 until a predetermined result is achieved or until there is no more data left for processing. Embodiments of the invention may provide for encoding information across channels having a wide range of reliability.

Embodiments of the invention may be configured to perform blind signal separation (BSS), such as independent component analysis. For example, A. Jourjine, S. Rickard, and O. Yilmaz, "Blind Separation of Disjoint Orthogonal Signals: Demixing N Sources from 2 Mixtures," in *Proceedings of the* 2000 *IEEE International Conference on Acoustics, Speech, and Signal Processing*, Istanbul, Turkey, June 2000, vol. 5, pp. 2985-88, which is included herein by reference, describes a blind source separation technique that allows the separation of an arbitrary number of sources from just two mixtures, provided the time-frequency representations of the sources do not overlap. The key observation in the technique is that for mixtures of such sources, each time-frequency point depends on at most one source and its associated mixing parameters.

In multi-user wireless communication systems that employ multiple transmit and receive antennas, the transmission of user information through a dispersive channel produces an instantaneous mixture between user transmissions. BSS may be used in such instances to separate received transmissions, particularly when training sequences and channel estimation are absent. In an exemplary embodiment of the invention, an OFDM-MIMO protocol may be provided across multiple independent WTs. Multiple transmissions are provided on at least one frequency channel, and frequency-domain techniques of BSS may be employed to recover received signals.

In one embodiment of the invention, at least one data transmission source may be adapted to convey its data across the WLAN to a plurality of WTs for transmission into the WWAN. In another embodiment of the invention, a plurality of WTs are adapted to receive data transmissions from a WWAN and couple said received data transmissions into a WLAN (with or without baseband processing) wherein centralized or distributed signal-processing means are provided for separating the data transmissions. Said signal-processing means includes any MIMO-processing techniques, including multi-user detection, space-time processing, space-frequency processing, phased-array processing, optimal combining, and blind source separation, as well as others.

In one embodiment of the invention, a vector of binary data symbols $b_i(n)$ are encoded with a convolutional encoder to produce a coded signal:

$$s_i(n) = b_i(n) * c(n)$$

where $c(n)$ represents a convolutional code of length L'. A cluster of N coded symbols corresponding to an $i^{th}$ user, data source, or data stream is represented by:

$$s_{n,i} = [s_i(n), \ldots, s_i(n+N-1)]^T$$

The transmit signal is generated by performing an N-point IDFT to $s_{n,i}$ to produce:

$$S_{n,i} = [S_i(n, 0), \ldots, S_i(n, N-1)]^T$$

where $$S_i(n, k) = \sum_{m=0}^{N-1} s_i(n+m) e^{i2\pi km/N}$$

The values $S_i(n,k)$ are transmitted via at least one of $N_t$ transmit antennas.

On the receive side, $N_r$ receive antennas (typically, $N_r \geq N_t$) are employed. The signal received by at antenna is expressed by:

$$R_j(n) = \sum_{i=1}^{N_t} S_i(n) * h_{ij} + n_j(n)$$

where $n_j(n)$ represents the zero-mean AWGN introduced by the channel, and $h_{ij}$ is the channel impulse-response of the $i^{th}$ transmit antenna to the $j^{th}$ receive antenna. The received signal can be interpreted as a convolutive mixture of the coded signals, where the channel matrix h represents the mixing system. An N-point DFT is applied to the received signals $R_j(n)$ to produce:

$$r_j = [r_j(n), \ldots, r_j(n+N-1)]^T$$

where $$r_j(n) = \sum_{m=0}^{N-1} R_j(n+m) e^{-i2\pi km/N}$$

Typically, a sufficient guard interval or cyclic prefix is employed to eliminate inter-symbol interference.

The signals from the $N_r$ receiver antennas are grouped with respect to frequency bin. An observation at a $k^{th}$ frequency bin are expressed by:

$$r_n(k) = [r_1(n+k), r_2(n+k), \ldots r_{N_r}(n+k))]^T = H(k)s(k) + n(k)$$

Thus, the observations $r_n(k)$ {k=0, . . . , N−1} can be interpreted as an instantaneous mixture of the transmitted signals s(k), where H(k) represents the mixing system.

There are many approaches for estimating the transmitted signals s(k) from the received signals $r_n(k)$ that may be employed by the current invention. An exemplary embodiment of the invention employs BSS techniques. One class of BSS produces an output vector having the following form:

$$y(k)=W^H(k)r_n(k)$$

where W(k) is an $N_r \times N_t$ matrix that groups the coefficients of the separating system. The output y(k) can also be expressed by:

$$y(k)=G(k)s(k)+W^H(k)n(k)$$

where $G(k)=W^H(k)H(k)$ represents the mixing/separating system. The goal of the separation process is to calculate the matrices W(k) so that the G(k) matrices are diagonal and the effects of noise $W^H(k)n(k)$ are minimized. Many different approaches are applicable for achieving these goals.

A BSS algorithm (such as the one described in J. F. Cardoso, A. Souloumiac, "Blind Beamforming for non-Gaussian Signals," *IEEE-Proceedings-F*, vol. 140, no. 6, pp. 362-370, December 1993, which is incorporated by reference herein) may be employed to separate the instantaneous mixture in each frequency bin. Each output at frequency bin k' can be regarded as corresponding to a single source at bin k' multiplied by a particular gain introduce by the algorithm. The outputs y(k') are then used as reference signals in order to recover the sources at frequencies k'±1. For example, the separation matrices W(k) are determined by minimizing the mean-square error between the outputs $y(k)=(k)r_n(k)$ and reference signals y(k'). For a given frequency bin k:

$$W_o(k)=\mathrm{argmin}_{W(k)}E[|y(k)-\alpha y(k')|^2]$$

where α is a real constant, which is selected with respect to the convolutional code:

$$\alpha = \frac{\sum_{p=0}^{L-1} c^2(p)}{\sum_{p=0}^{L-2} c(p)c(p+1)}$$

This is done to ensure G(k)=G(k'). The solution to the optimization problem is given by:

$$W_o(k)=\alpha R_{r_n}^{-1}(k)R_{r_n y}(k,k')$$

where $$R_{r_n}(k)=E[r_n(k)x^H(k)] \text{ and}$$

$$R_{r_n y}(k,k')=E[r_n(k)y^H(k')]$$

Figure 4A:
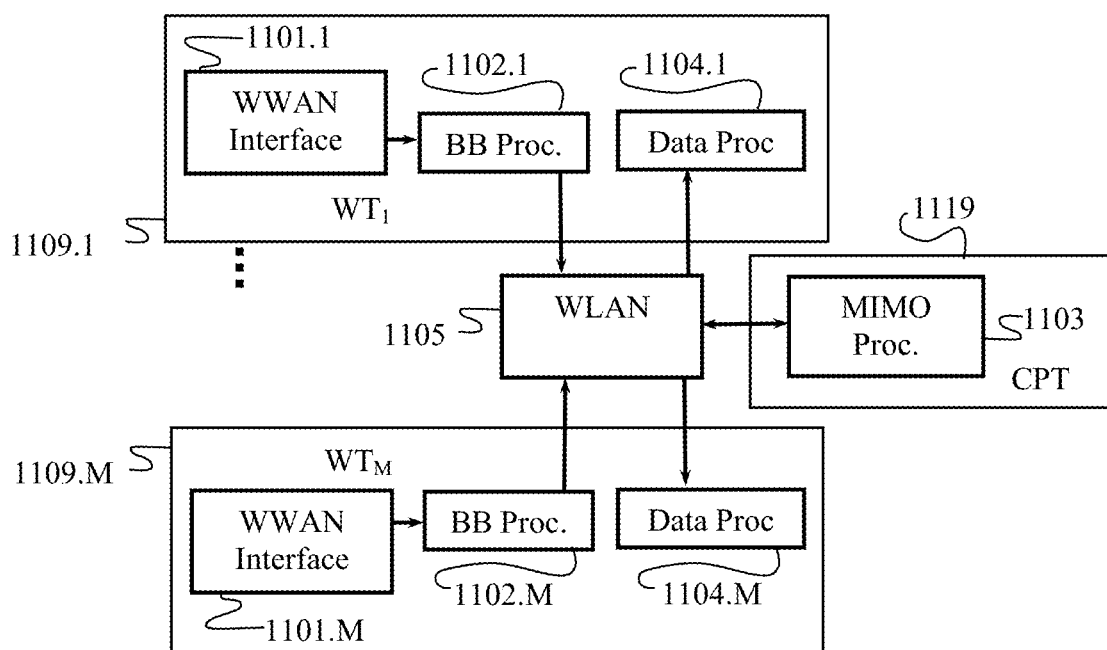
FIG. 4A illustrates a MIMO receiver embodiment of the invention.

FIG. 4A illustrates an embodiment of the invention wherein a plurality M of WTs 1109.1-1109.M is coupled to a MIMO processor 1103 via a WLAN 1105. In this particular embodiment, a computer-processing terminal 1119 may include the MIMO processor 1103. The computer processing terminal 1119 may be provided with WLAN-interface functionality, and may optionally include WWAN-interface functionality.

The computer-processing terminal 1119 may include any of a plurality WLAN-connected devices with signal-processing capability. For example, the computer-processing terminal 1119 may include one of the WTs 1109.1-1109.M. In one aspect of the invention, the computer-processing terminal 1119 comprises a WLAN controller. In another aspect of the invention, the computer processing terminal 1119 comprises a network gateway, router, or access point including a CPU adapted to process signals received from the plurality of WTs 1109.1-1109.M. Applications of embodiments of the invention include (but are not limited to) sensor networks, micro-networks, RFID systems, cellular networks, and satellite networks.

Each WT 1109.1-1109.M may include a baseband processor 1102.1-1102.M adapted to provide WWAN baseband (or IF) signals to the MIMO processor 1103 via the WLAN 1105. The MIMO processor 1103 may be configured to separate interfering WWAN data symbols in the WWAN baseband signals. The separated WWAN data symbols are then coupled back to data processors 1104.1-1104.M in the WTs 1109.1-1109.M.

Figure 4B:
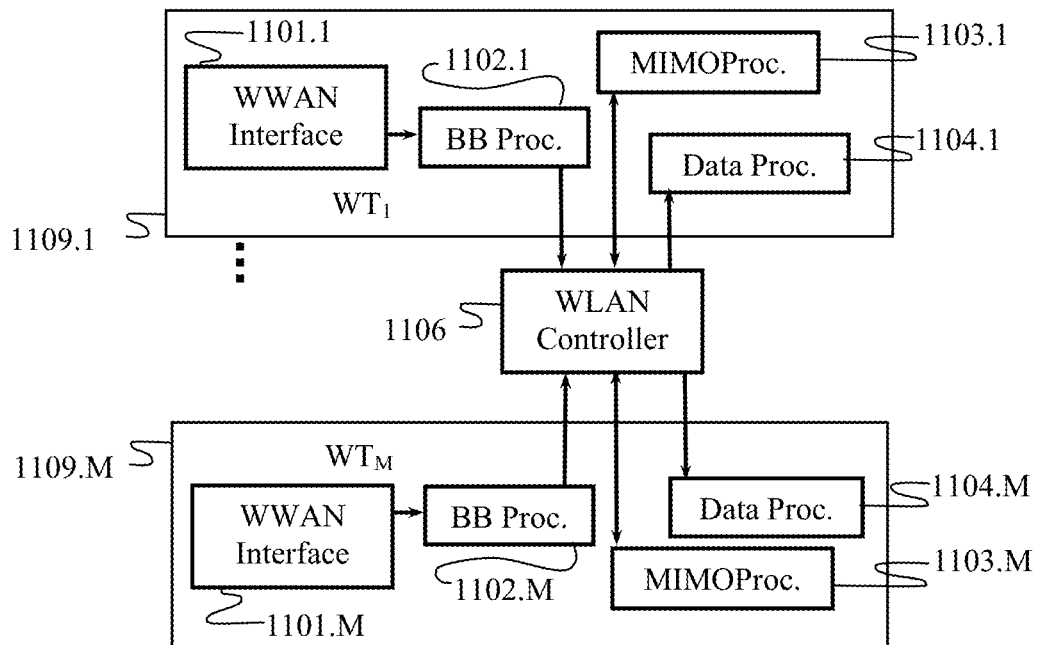
FIG. 4B illustrates a functional embodiment of the invention in which MIMO processing operations are distributed over two or more WTs.

FIG. 4B illustrates a functional embodiment of the invention in which MIMO processing operations (represented by MIMO processors 1103.1-1103.M) may be distributed over two or more WTs 1109.1-1109.M. Baseband processors 1102.1-1102.M provide WWAN baseband signals to a WLAN controller 1106, which may distribute the signals (and signal-processing instructions) to the MIMO processors 1103.1-1103.M. The separated WWAN data symbols are then coupled back to data processors 1104.1-1104.M.

Figures 4C, 4D:
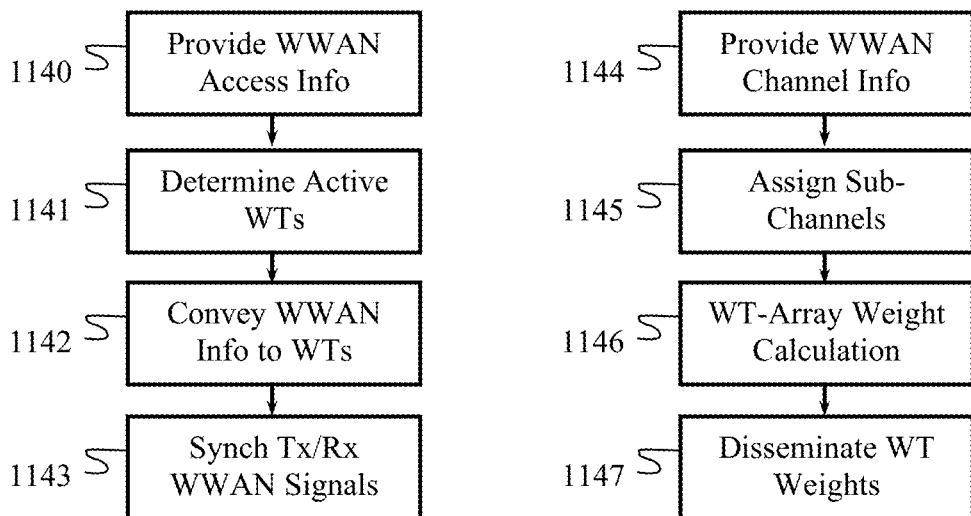
FIG. 4C illustrates a functional embodiment of the invention for transmission and reception of WWAN signals in a distributed network of WTs.
FIG. 4D illustrates a functional embodiment of the invention adapted to perform cooperative beamforming.

FIG. 4C represents a functional embodiment of the invention. At least one WT may provide WWAN access information 1140 to a WLAN controller. The WWAN access information typically includes necessary information (such as at least one WWAN channel assignment, authentication codes, etc.) to access at least one particular WWAN channel. The WWAN access information may optionally include performance information, such as WWAN channel estimates, link-bandwidth demand, link priority, and/or WWAN channel-quality measurements (e.g., SNR, SINR, BER, PER, latency etc.). This information is typically provided to the WLAN controller by one or more WTs.

The WLAN controller determines which WTs to activate 1141 for a particular WWAN communication link. This may be performed for either or both transmission and reception. The determination of which WTs will be active 1141 in a given WWAN link typically depends on a combination of factors, including (but not limited to) the number M of WTs required to achieve predetermined channel characteristics or access parameters, which WTs have the best WWAN channel quality, load balancing, power-consumption balancing, computational overhead, latency, and WLAN-access capabilities. Accordingly, the WLAN controller may send control information via the WLAN to the WTs that includes state information (e.g., operating-mode assignments, such as active, standby, sleep, and awake).

The WLAN controller may convey WWAN information to the active WTs 1142. The WWAN information may be derived from the WWAN access information and provided to the WTs to establish and/or maintain at least one WWAN link. Accordingly, the WWAN information may include WWAN channel assignments. The WWAN information may include beam-forming weights and/or space-time codes. Accordingly, the step of conveying WWAN information to the WTs 1142 may optionally include a preliminary signal-processing step (not shown), such as blind adaptive or deterministic weight calculation. This preliminary signal-processing step (not shown) may be distributed among a plurality of the WTs, or it may be performed in a centralized mode, such as by a single computing terminal. A distributed-computing mode may take various forms. In one mode, each of a plurality of WTs takes its turn functioning as a computing terminal. In another mode, multiple WTs function as computing terminals simultaneously.

Communications in the WWAN link are coordinated between the WTs in order to synchronize the transmitted and/or received WWAN signals 1143. A receiver embodiment of the invention may provide for synchronizing the received WWAN signals, such as to provide for coherent combining. A transmitter embodiment of the invention may provide for synchronizing the transmitted WWAN signals from the WTs such as to enable coherent combining at some predetermined WWAN terminal.

An optional transmitter embodiment of the invention may employ synchronization to deliberately time-offset signals arriving at one or more WWAN terminals in order to provide for transmit diversity by the WTs. In such embodiments, one or more of the WT transmissions may be provided with time-varying complex weights (e.g., amplitudes and/or phases), such as described in S. A. Zekavat, C. R. Nassar and S. Shattil, "Combined Directionality and Transmit Diversity via Smart Antenna Spatial Sweeping," proceedings of 38$^{th}$ *Annual Allerton Conference on Communication, Control, and Computing, University of Illinois in Urbana-Champaign*, pp. 203-211, Urbana-Champaign, Ill., USA, October 2000, S. A. Zekavat, C. R. Nassar and S. Shattil, "Smart antenna spatial sweeping for combined directionality and transmit diversity," *Journal of Communications and Networks (JCN), Special Issue on Adaptive Antennas for Wireless Communications*, Vol. 2, No. 4, pp. 325-330, December 2000, and S. A. Zekavat, C. R. Nassar and S. Shattil, "Merging multi-carrier CDMA and oscillating-beam smart antenna arrays: Exploiting directionality, transmit diversity and frequency diversity," *IEEE Transactions on Communications*, Vol. 52, No. 1, pp. 110-119, January 2004, which are incorporated by reference herein.

In an alternative embodiment of the invention, providing WWAN access information 1140 may include providing WWAN channel-performance information from the WTs to at least one WWAN terminal. Thus, conveying WWAN information to the WTs 1142 may be performed by at least one WWAN terminal. An optional embodiment of the invention may provide for at least one WWAN terminal determining which WTs in a WLAN group will operate in a given WWAN link and conveying that WWAN information 1142 to the WLAN group. Embodiments of the invention may provide capabilities to WWAN terminals to set up and adapt the formation of WLAN groups and determine which WTs are assigned to which WLAN groups. Such control capabilities may employ GPS positions of WTs to assist in assigning WTs to a WLAN group. Some embodiments of the invention may provide for collaboration between a WWAN and a WLAN group for activating WTs and/or assigning WTs to the WLAN group.

In one embodiment of the invention, step 1142 may include a preliminary signal-processing step (not shown) in which at least one WWAN terminal calculates cooperative-beamforming weights for the WTs based on channel-performance information provided by the WTs. Accordingly, the WWAN information may include cooperative-beamforming weights derived by at least one WWAN terminal and conveyed to at least one WT. Synchronization 1143 of the transmitted and/or received WWAN signals by the WTs may optionally be performed by at least one WWAN terminal. Similarly, embodiments of the invention may provide for applying time-varying weights to WWAN-terminal transmissions (such as described previously).

FIG. 4D illustrates a functional embodiment of the invention adapted to perform cooperative beamforming. WWAN channel information is provided 1144 for assigning subchannels 1145 and calculating cooperative beamforming (i.e., WT) weights 1146. The beamforming weights are then distributed to the appropriate WTs 1147.

Sub-channel assignments 1145 are typically performed with respect to a predetermined subchannel-quality threshold, such as SNR, SINR, or BER. Subchannels having the required minimum performance may be assigned for transmission and/or reception. Sub-channel assignments 1145 may also provide for bit loading. Alternatively, sub-channel assignments 1145 may be performed without regard to sub-channel quality. In such cases, spreading or channel coding may be performed to mitigate the effects of lost and compromised subchannels.

Weight calculations 1146 may be achieved by either deterministic or blind adaptive techniques. The calculations may be performed by one or more WTs, or alternatively, by at least one WWAN terminal. Cooperative beamforming weights may be provided to achieve at least one form of array processing benefit, including diversity combining, interference cancellation, and spatial reuse.

FIG. 5A illustrates a functional embodiment of the invention that may be implemented by hardware and/or software. A plurality of transmitted WWAN signals are received 1150 by a plurality of WTs. Baseband (or IF) WWAN information is derived 1151 from the received WWAN signals. For example, in an OFDM system, a baseband WWAN signal $s_k$ received by a $k^{th}$ WT can be represented by a linear superposition of up to M transmitted data symbols $d_i$ {i=1, ..., M} weighted by complex channel weights $\alpha_{ik}$:

$$s_k = \sum_{i=1}^{M} \alpha_{ik} d_i + \eta_k$$

Baseband WWAN signals (which typically include the complex channel weights $\alpha_{ik}$), are optionally transmitted 1158 into a WLAN for distribution to one or more other WTs. Accordingly, data (including baseband WWAN signals $s_k$, complex channel weights $\alpha_{ik}$, and/or MIMO weights $\beta_{il}$) from the one or more other WTs is received 1152 from the WLAN. MIMO processing 1153 may be performed to produce at least one set of MIMO weights $\beta_{il}$ and/or estimated transmitted data symbols $d_i$, which may optionally be transmitted 1159 to at least one other WT via the WLAN. Baseband information recovery 1154 may optionally be performed on the estimated transmitted data symbols $d_i$. For example, baseband operations may include despreading, demodulation, error correction (e.g., channel decoding), demultiplexing, de-interleaving, data formatting, etc.

FIG. 5B illustrates an alternative functional embodiment of the invention that may be implemented by hardware and/or software. In this case, WWAN baseband information that does not include MIMO weights may be received 1155 from at least one other WT via the WLAN. Thus, MIMO processing 1153 includes generating MIMO weights, which may be transmitted 1159 to one or more WTs via the WLAN. The functional embodiment illustrated in FIG. 5B is particularly applicable to a WT functioning as a computer-processing terminal in a WLAN group. In the case where the subject WT functions as the only MIMO-processing terminal in a given WLAN group, the functional embodiment may be characterized solely by steps 1155, 1153, 1154, and optional step 1159. Furthermore, the functional embodiments described herein may be adapted to perform other array-processing operations in addition to, or instead of, MIMO.

Figure 6A:
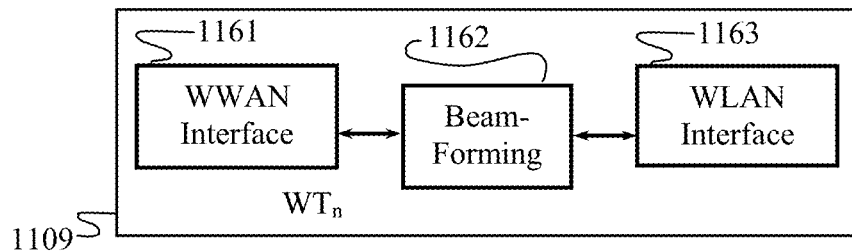
FIG. 6A illustrates functional and apparatus embodiments of the present invention pertaining to one or more WTs coupled to at least one WWAN and at least one WLAN.

FIG. 6A illustrates functional and apparatus embodiments of the present invention pertaining to one or more WTs, such as WT 1109. In particular, a WWAN interface 1161 may be coupled to a beam-forming system 1162, which is coupled to a WLAN interface 1163. The beam-forming system 1162 may employ data received from the WLAN interface 1163 (and optionally, from data received from the WWAN interface 1161) to perform beam-forming operations. The WLAN interface 1163 is adapted to provide WLAN data communications with at least one other WT (not shown). The beam-forming system 1162 may be adapted to provide either or both WWAN transmission beam-forming and reception beam-forming operations.

Figure 6B:
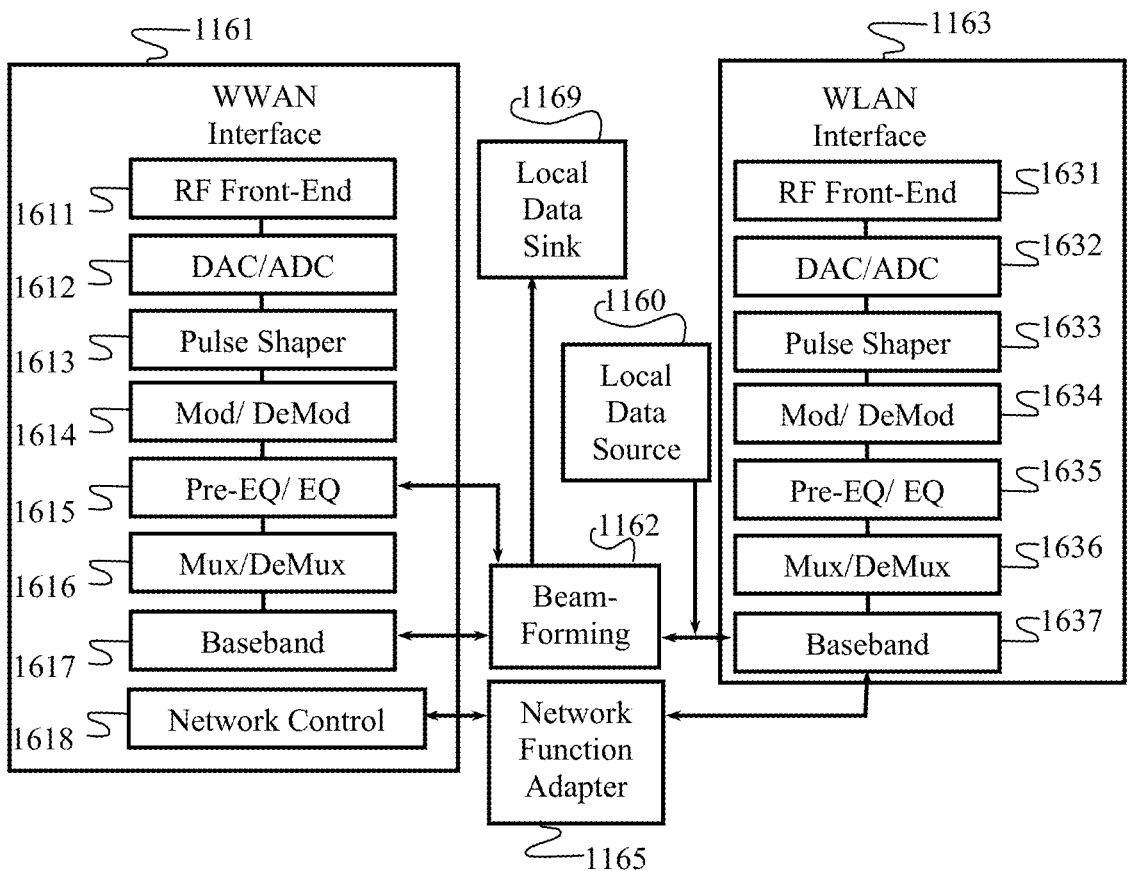
FIG. 6B illustrates a preferred embodiment of the invention that may be employed as either or both apparatus and functional embodiments of one or more WTs.

FIG. 6B illustrates a preferred embodiment of the invention that may be employed as either or both apparatus and functional embodiments. A WWAN interface 1161 includes an RF front-end 1611, a DAC/ADC module 1612, a pulse-shaping filter 1613, a modulator/demodulator module 1614, an equalizer modulator 1615 that optionally employs pre-equalization means, a multiplexer/demultiplexer module 1616, and a baseband-processing module 1617. The WWAN interface may also include a network-control module 1618 that may be responsive to both WWAN control signaling and WLAN-control signals configured to convey WWAN control information to the WWAN interface 1161.

A WLAN interface 1163 includes an RF front-end 1631, a DAC/ADC module 1632, a pulse-shaping filter 1633, a modulator/demodulator module 1634, an equalizer modulator 1635 that optionally employs pre-equalization means, a multiplexer/demultiplexer module 1636, and a baseband-processing module 1637. A beam-forming module 1162 is adapted to process signals from either or both baseband modules 1617 and 1637. The beam-forming module 1162 may be adapted to process local data symbols generated by a local data source 1160.

As described previously, the beam-forming module 1162 may be adapted to perform beam-forming operations on baseband WWAN signals received from either or both the WWAN interface 1161 and the WLAN interface 1163. Specifically, the beam-forming module 1162 may be adapted to perform beam forming by utilizing baseband WWAN signals, channel weights (or other channel-characterization information), beam-forming weights (such as MIMO weights), and/or baseband data symbols. Baseband data symbols may be received from the local data source 1160, from local data sources on other WTs, and/or from estimated data generated by one or more external beam-forming modules (e.g., beam-forming modules on other WTs). Optionally, the beam-forming module 1162 may be configured to adjust equalization and/or pre-equalization 1615.

In an exemplary embodiment of the invention, the beam-forming module 1162 is configured to process baseband WWAN signals received from the baseband-processing module 1617 and the WLAN interface 1163. Information output from the beam-forming module 1162 is conveyed to at least one of the WLAN interface 1163 and a local data sink 1169. Estimated WWAN data symbols output by the beam-forming module 1162 may optionally be processed by the baseband-processing module 1617 or the local data sink 1169. For example, the baseband-processing module 1617 may be configured to perform various types of signal processing, including error correction (such as Viterbi decoding), constellation mapping, and data formatting on data output by the beam-forming module 1162. The resulting processed data may then be coupled to the local data sink 1169 and/or the WLAN interface 1163. Alternatively, the local data sink 1169 may perform the previously described signal-processing types.

Beam forming is performed cooperatively with other WTs to provide predetermined WWAN spatial processing for transmitted and/or received WWAN signals. Thus, a network-function adapter 1165 may be employed to provide WWAN channel-access information to one or more WTs. For example, some embodiments of the invention require multiple WTs to function as a single WT. In this case, each WT is provided with WWAN-access information corresponding to the single WT it is configured to spoof. The network function adapter 1165 may be configured to generate WWAN-access information to be distributed to at least one other WT and/or it may be configured to receive WWAN-access information from the WLAN interface 1163 and convey it to the network-control module 1618 in the WWAN interface 1161.

WWAN-access information typically includes channelization (or some other form of multiple access) information used to transmit and/or receive data from the WWAN. For example, WWAN-access information may take the form of user identification sequences, assigned time slots, frequency band assignments, and/or multiple-access code assignment.

In some embodiments of the invention, a particular WT may be required to function as multiple WTs. In this case, WWAN-access information is conveyed to the network-control module 1618 and data is configured to be appropriately multiplexed and/or demultiplexed relative to a plurality of multiple-access channels.

The network-function adapter 1165 may be used to convey other WWAN control information to WTs, including (but not limited to) power-control commands, timing and synchronization information, key-exchange messages, WWAN routing tables, acknowledgements, requests for retransmission, probing signals, and paging messages. The network-function adapted 1165 may be configured to alter or adapt the WWAN-control information that it receives from either or both the WWAN interface 1161 and the WLAN interface 1163. For example, WWAN power-control commands received by one or more WTs may be adapted by the network-function adapter 1165 prior to being conveyed to network-control modules (such as network-control module 1618) on multiple WTs. Power control may be adapted by one or more network-function adapters 1165 for particular WTs depending on their WWAN channel quality and power. Alternatively, the network-function adapter 1165 may adapt the number M of WTs servicing a given link in response to WWAN control information.

In some embodiments of the invention, it may be advantageous to employ a single decision system for network-function adaptation 1165. In one mode of operation, the network-function adapter 1165 of only one of a plurality of WTs assigned to a particular WWAN channel is adapted to convey WWAN control information to the other WTs. In each of the other WTs, the associated network-function adapter 1165 identifies the WWAN control information received from the WLAN and couples it to the network-control module 1618. Thus, the network-function adapter 1165 may instruct the network-control module 1618 to disregard one or more types of WWAN control information received from the WWAN interface 1161. One or more network-function adapters (such as network-function adapter 1165) may synchronize WT responses to WWAN control information.

In another embodiment of the invention, each WT may be responsive to WWAN control information that it receives. In yet another embodiment, each of a plurality of WWAN multiple-access channels is preferably controlled by a separate network-function adapter 1165. These and other adaptations and permutations of network function may be embodied by functional aspects of the network-function adapter 1165.

One embodiment of the invention employs the functionality of a group of WTs corresponding to FIG. 1C with respect to the transceiver embodiment shown in FIG. 6B. In a transmission configuration, a serial data stream s(n) from the local data source 1160 of a particular WT is channel coded to produce coded data stream u(n), which is grouped in blocks of size N: $u(i)=[u(iN), u(iN+1), \ldots, u(iN+N-1)]^T$. In this case, N is chosen to equal the number M of WTs employed as antenna elements. The N−1 coded data symbols u(n) are distributed to the other N−1 WTs via the WLAN interface 1163.

At each WT's Mux/DeMux block 1615, a particular data symbol u(n) is mapped into a frequency bin vector. In one aspect of the invention, each data symbol u(n) is provided with both a unique frequency bin and a unique WT, such as to achieve optimal diversity benefits. This takes the form of a frequency-bin vector having all zeros except for one bin corresponding to u(n). This scheme can be used to achieve low transmitted PAPR, as well as other benefits. In other embodiments, alternative WT/frequency-bin combinations may be employed. For example, multiple serial data streams s(n) may be provided to the frequency-bin vector. Redundant symbols may be provided. Alternatively, the data s(n) may be spread across frequencies and/or WTs.

At each Mod/DeMod block 1614, an IFFT is applied to each data block to produce:

$$\tilde{u}(i) = F^H u(i)$$

where F is the N×N FFT matrix with $F_{nm} = N^{-1/2} \exp(-j2\pi nm/N)$ A cyclic prefix of length $N_{CP}$ may be inserted in $\tilde{u}(i)$ to produce $\tilde{u}_{CP}(i) = \beta T_{CP} \tilde{u}(i)$, which has length $N_T = N + N_{CP}$. The term $T_{CP} = [I_{CP}^T I_N^T]^T$ represents the cyclic prefix insertion in which the last $N_{CP}$ rows of the N×N identity matrix $I_N$ (denoted by $I_{CP}$) are concatenated with identity matrix $I_N$. The term $\beta$ is the power loss factor, $\beta = \sqrt{N/N_T}$.

The block $\tilde{u}_{CP}(i)$ is serialized to yield $\tilde{u}_{CP}(n)$, which is then pulse shaped 1613, carrier modulated 1612, amplified, and transmitted 1611 via multiple antenna elements through a channel. The channel impulse response h(n) includes the effects of pulse shaping, channel effects, receiver filtering, and sampling.

In a receiver configuration of the invention, each of a plurality of WTs is adapted to receive a different transmitted symbol on a different orthogonal carrier frequency. For a WT employing a square-root Nyquist receive filter, the received samples are expressed by:

$$x(n) = \tilde{u}_{CP}(n) * h(n) + v(n)$$

where v(n) is additive white Gaussian noise (AWGN). The received samples are grouped into blocks of size $N_T$: $x_{CP}(i) = [x(iN_T), x(iN_T+1), \ldots, x(iN_T+N_T-1)]^T$. The first $N_{CP}$ values of $x_{CP}(i)$ corresponding to the cyclic prefix are discarded, which leaves N-length blocks expressed by: $x(i) = [x(iN_T+N_{CP}), x(iN_T+N_{CP}+1), \ldots, x(iN_T+N_T-1)]^T$. H is defined as an N×N circulant matrix with $\tilde{H}_{n,m} = h((n-m)_{mod\ N})$. The block input-output relationship is expressed as: $\tilde{x}(i) = \beta \tilde{H}\tilde{u}(i) + \tilde{\eta}(i)$, where $\tilde{\eta}(i) = [v(iN_T+N_{CP}), v(iN_T+N_{CP}+1), \ldots, v(iN_T+N_T-1)]^T$ is the AWGN block. Applying the FFT to $\tilde{x}(i)$ yields:

$$x(i) = F\tilde{x}(i) = \beta F \tilde{H} F^H u(i) + \tilde{\eta}(i) = \beta D_H u(i) + \eta(i)$$

where $$D_H = \text{diag}[H(e^{j0}), H(e^{j(2\pi/N)}), \ldots H(e^{j(2\pi(N-1)/N)})] = F\tilde{H}F^H$$

and $H(e^{j2\pi f})$ is the frequency response of the ISI channel;

$$H(e^{j2\pi f}) = \sum_{n=0}^{N_{CP}} h(n) e^{-j2\pi fn}.$$

An equalizer followed by a decoder uses x(i) to estimate the data symbols encoded on u(i).

Preferred embodiment of the invention may employ Spread-OFDM, which involves multiplying each data block s(n) by a spreading matrix A:

$$u(n) = As(n)$$

In the case where CI spreading codes are employed, $A_{nm} = \exp(-j2\pi nm/N)$. This maps the data symbols to pulse waveforms positioned orthogonally in time. This choice of spreading codes also gives the appearance of reversing the IFFT. However, the resulting set of pulse waveforms is a block, rather than a sequence, wherein each waveform represents a cyclic shift within the block duration $T_s$, such as described in U.S. Pat. Appl. Pubs. 20030147655 and 20040086027, which are both incorporated by reference.

Figure 7A:
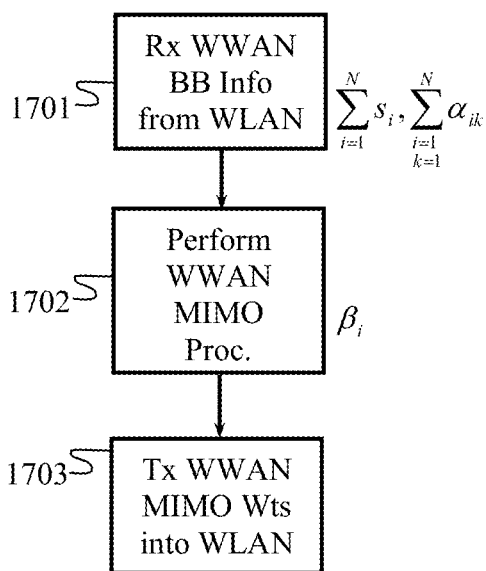
FIG. 7A illustrates a functional embodiment of the invention related to calculating MIMO weights in a cooperative-beamforming network.

FIG. 7A illustrates a functional embodiment of the invention related to calculating MIMO weights in a cooperative-beamforming network. A plurality of WTs provide received baseband information from a WWAN channel 1701 that includes a training sequence and/or a data sequence having a predetermined constellation of values. WWAN MIMO processing is performed 1702 on the received baseband information to derive a plurality of array-processing weights $\beta_i$, which are then distributed 1703 via the WLAN to a predetermined plurality of WTs.

Figure 7B:
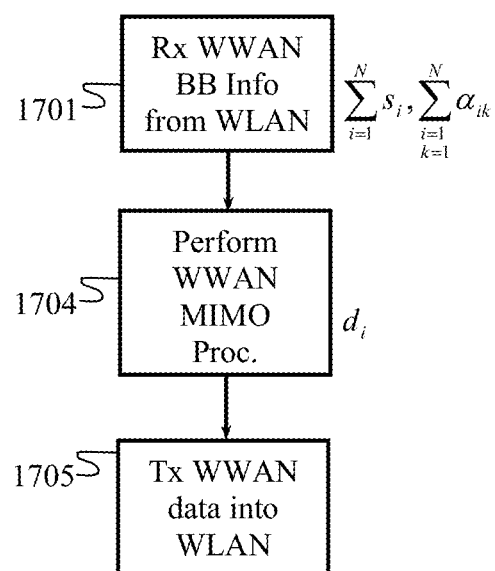
FIG. 7B illustrates a functional embodiment of the invention adapted to calculate transmitted data symbols received by a cooperative-beamforming network.

FIG. 7B illustrates a functional embodiment of the invention adapted to calculate transmitted data symbols received by a cooperative-beamforming network. A plurality of WTs provide received baseband information from a WWAN channel 1701 that includes a data sequence having a predetermined constellation of values. WWAN MIMO processing may be performed 1704 on the received baseband information to derive a plurality of estimated data symbols $d_i$, which are then conveyed 1705 via the WLAN to at least one destination WT. The WWAN MIMO processing 1704 may optionally include providing for any of a set of signal-processing operations, including filtering, demodulation, demultiplexing, error correction, and data formatting.

Figure 8A:
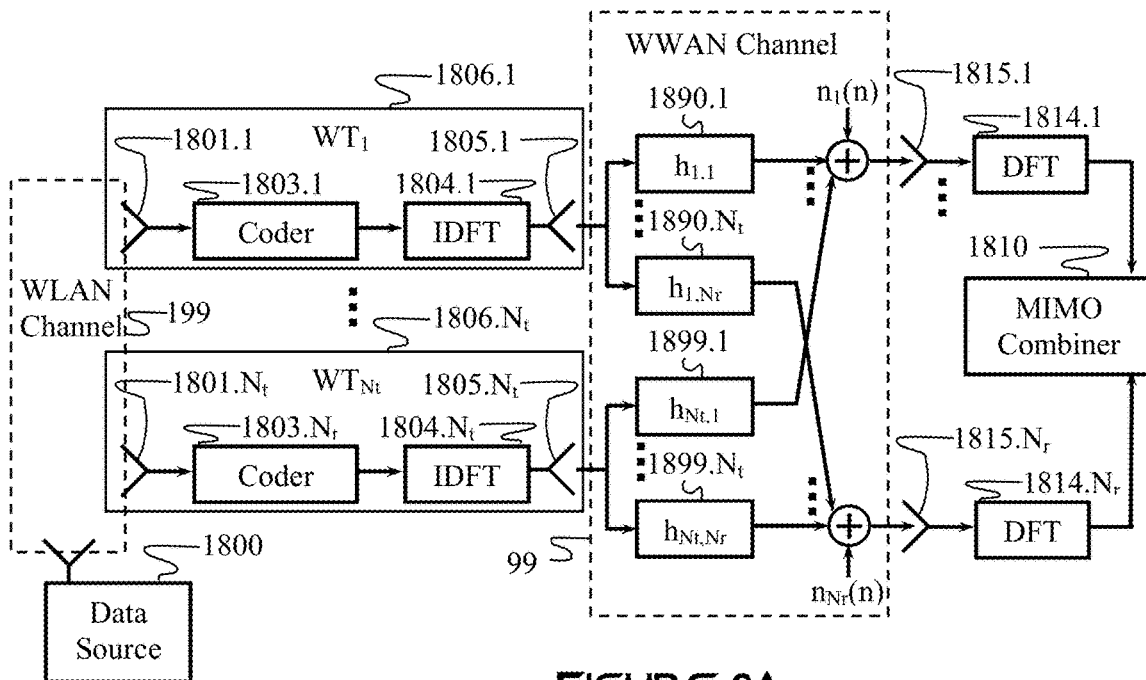
FIG. 8A illustrates a preferred transmitter embodiment of the invention.

FIG. 8A illustrates a functional embodiment for a method and apparatus of the invention. Specifically, a data source 1800 is adapted to distribute a plurality of data symbols via a WLAN channel 199 to a plurality $N_t$ of WTs 1806.1-1806.$N_t$, which are adapted to transmit the data symbols into at least one WWAN channel 99. Although the functional embodiment shown in FIG. 8A is illustrated with respect to uplink WWAN functionality, the functional blocks may alternatively be inverted to provide for downlink WWAN functionality.

The data source and the WTs 1806.1-1806.$N_t$ include appropriate WLAN-interface equipment to support distribution of the data symbols to the WTs 1806.1-1806.$N_t$. For example, the WTs 1806.1-1806.$N_t$ are shown including WLAN-interface modules 1801.1-1801.$N_t$. The WLAN channel 199 may optionally include additional network devices that are not shown, such as routers, access points, bridges, switches, relays, gateways, and the like. Similarly, the data source 1800 and/or the WTs 1806.1-1806.$N_t$ may include one or more said additional network devices. The data source 1800 may include at least one of the WTs 1806.1-1806.N$_t$.

A coder 1803.1-1803.N$_t$ in each of the WTs 1806.1-1806.N$_t$ is adapted to receive a baseband data sequence from the associated WLAN-interface module 1801.1-1801.N$_t$ and provide coding, such as channel coding, spreading, and/or multiple-access coding. A coded data sequence output from each coder 1803.1-1803.N$_t$ is mapped into frequency bins of multicarrier generators, such as IDFTs 1804.1-1804N$_t$. This embodiment may be employed to produce multicarrier signals or to synthesis single-carrier signals from a plurality of spectral components. Alternatively, other types of multicarrier generators may be employed, such as quadrature-mirror filters or DSPs configured to perform other transform operations, including Hadamard transforms. The resulting multi-carrier signals are coupled into the WWAN channel 99 by associated WWAN-interface modules 1805.1-1805.N$_t$.

For each flat-fading subcarrier frequency channel, the WWAN channel may be characterized by channel responses 1890.1-1890-N$_t$ and 1899.1-1899-N$_t$ of a mixing system. The channel responses 1890.1-1890-N$_t$ and 1899.1-1899-N$_t$ represent elements of H, an N$_r$×N$_t$ channel-response matrix that characterizes the complex gains (i.e., transfer function, or spatial gain distribution) from the N$_t$ transmission elements to the N$_r$ receive elements; and n$_i$(n) represents an AWGN contribution having zero mean and zero variance.

There are N$_r$ receiver elements comprising WWAN-interface modules 1815.1-1815.N, and filter banks, such as DFTs 1814.1-1814.N$_r$, coupled to at least one MIMO combiner 1810. The MIMO combiner 1810 is adapted to perform any number of signal-processing operations, including decoding received data symbols. In one embodiment of the invention, the MIMO combiner 1810 is adapted to perform diversity combining. In another embodiment of the invention, the MIMO combiner 1810 is adapted to perform spatial (e.g., sub-space) processing. Furthermore, many other applications and embodiments of the invention may be achieved using the functional description (or minor variations thereof) depicted in FIG. 8A.

Figure 8B:
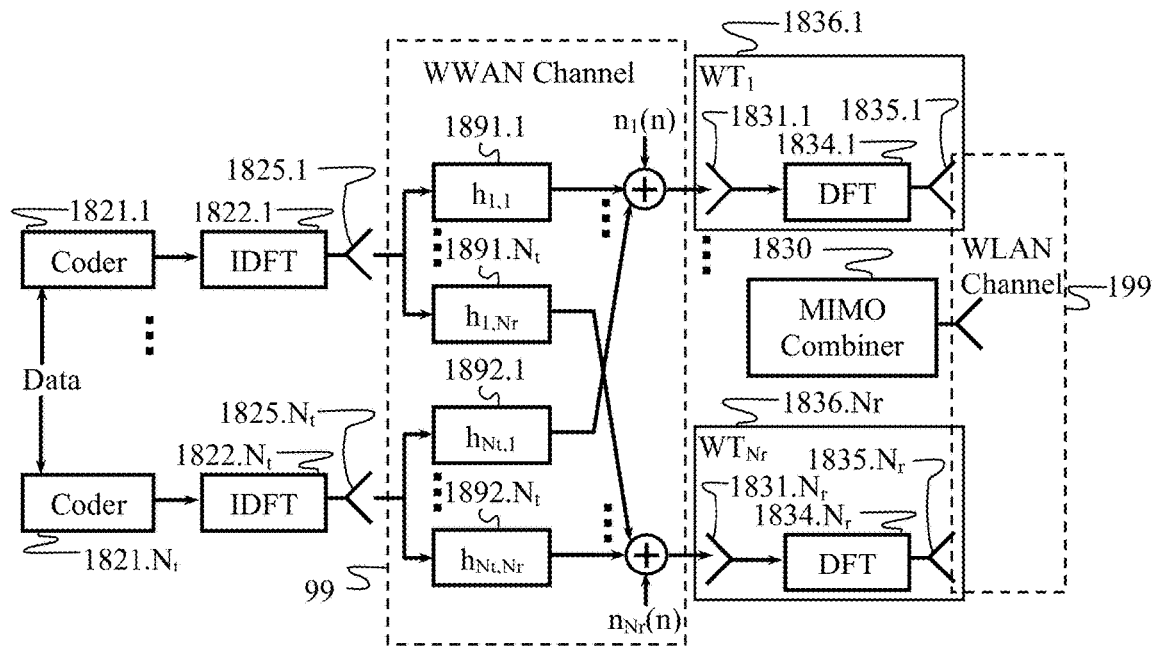
FIG. 8B illustrates a preferred receiver embodiment of the invention.

FIG. 8B illustrates a functional embodiment of the invention that may be incorporated into specific apparatus and method embodiments. In particular, WWAN signals received from a WWAN channel 99 by a plurality N$_r$ of WTs 1836.1-1836.N$_r$ are conveyed via a WLAN channel 199 to a MIMO combiner 1830.

In this case, WWAN data symbols are encoded by one or more coders (such as coders 1821.1-1821.N$_t$), impressed on a plurality of subcarriers by IDFTs 1822.1-1822.N$_t$, and coupled into the WWAN channel 99 by a plurality of WWAN-interface modules 1825.1-1825.N$_t$. Received WWAN signals may be coupled from the WWAN channel 99 by a plurality N$_r$ of WTs 1836.1-1836.N$_r$. Each WT 1836.1-1836.N, includes at least one WWAN-interface module (such as WWAN-interface modules 1831.1-1831.N$_r$), a filter bank (such as DFTs 1834.1-1834.N$_r$), and a WLAN-interface module (such as 1835.1-1835.N$_r$).

WWAN signals received by each WT 1836.1-1836.N$_r$ are converted to a baseband data sequence, separated into frequency components (by the DFTs 1834.1-1834.N$_r$), and then adapted for transmission into the WLAN channel 99. A MIMO combiner 1830 may be configured to receive WLAN transmissions, recover the frequency components, and perform MIMO processing to generate estimates of the transmitted WWAN data symbols. The MIMO combiner 1830 and/or the WTs 1836.1-1836.N$_r$ may be adapted to perform decoding. In one embodiment of the invention, the MIMO combiner 1830 may include one or more of the WTs 1836.1-1836.N$_r$.

Figure 8C:
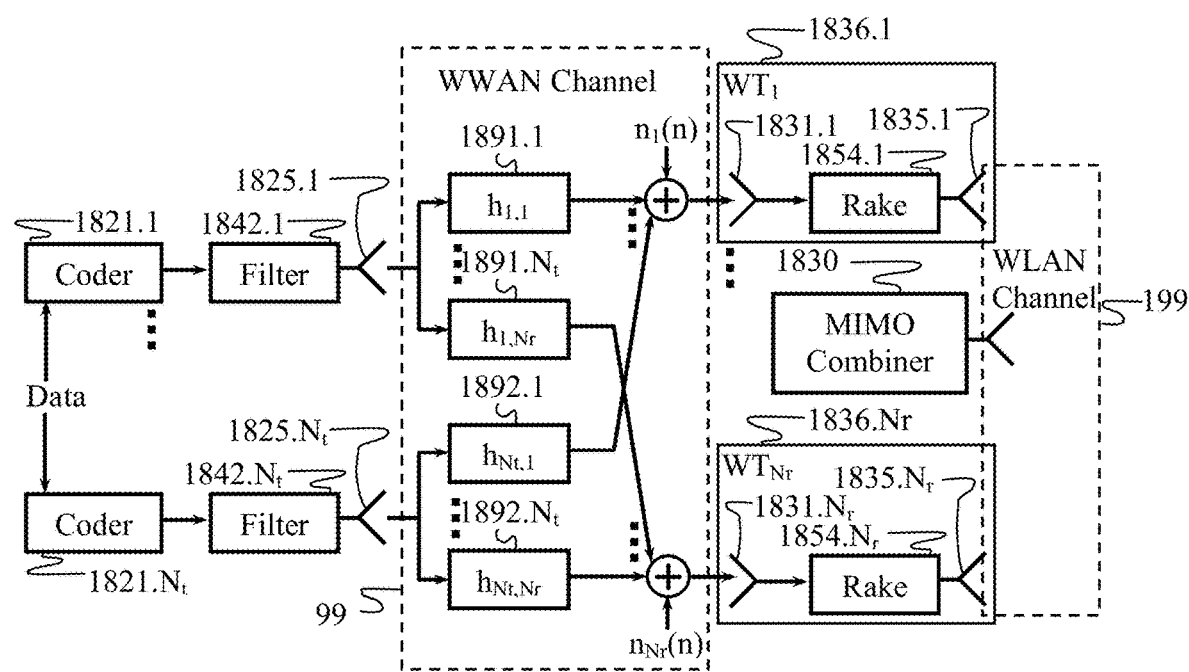
FIG. 8C illustrates an embodiment of the invention in which a plurality of WTs is adapted to perform time-domain processing.

FIG. 8C illustrates an embodiment of the invention in which WTs 1836.1-1836.N$_r$ are adapted to perform time-domain (e.g., Rake) processing. Specifically, each WT 1836.1-1836.N$_r$ includes a Rake receiver 1854.1-1854.N$_r$. The embodiment illustrated in FIG. 8C is particularly suited to performing MIMO operations on received direct-sequence signals, such as direct sequence CDMA (DS-CDMA) signals.

Particular embodiments of the invention may be directed toward transmitting and/or receiving any of the well-known types of spread signals. Spread signals include spread-spectrum signals in which a transmitted signal is spread over a frequency band much wider than the minimum bandwidth needed to transmit the information being sent. Spread spectrum includes direct-sequence modulation commonly used in CDMA systems (e.g., cdmaOne, cdma2000, 1×RTT, cdma 1×EV-DO, cdma 1×EV-DV, cdma2000 3×, W-CDMA, Broadband CDMA, and GPS), as well as frequency-domain spreading techniques, such as spread-OFDM, multi-carrier CDMA, and multi-tone CDMA.

In a DS-CDMA system, a k$^{th}$ WWAN transmission signal s$^k$(t) that includes N code bits $\{b^k[n]\}_{n=1}^{N}$ is given by:

$$s^k(t) = \sum_{n=0}^{N-1} b^k[n] g_{T_b}(t - nT_b) g_\tau(t) a^k(t - iT_b) \cos(2\pi f_c t) \text{ where}$$

$$a^k(t) = \sum_{i=0}^{G-1} C_i^k g_{T_c}(t - iT_c),$$

$C_i^k \in \{-1,1\}$ is the DS spreading signal, G represents processing gain, $T_c$ is the chip duration, $T_b$ is the bit duration, and $g_{T_c}(t)$, $g_{T_b}(t)$, and $g_r(t)$ represent the chip, bit, and transmitted pulse shapes, respectively.

A plurality M of WTs linked together by a WLAN comprises elements of an M-element antenna array capable of receiving K≤M transmission channels. In a frequency-selective channel, the received signal at the array is:

$$r(t) = \sum_{k=1}^{K} \sum_{l=0}^{L^k-1} \sum_{n=0}^{N-1} \alpha_l^k \vec{V}(\vartheta_l^k) b_k[n] g(t - \tau_l^k - nT_b) \cos(2\pi f_c t + \varphi_l^k) + \upsilon(t)$$

where $\vec{V}(\vartheta)$ is an array-response vector, K is the number of received transmission channels, L$^k$ is the number of distinct fading paths corresponding to the k$^{th}$ user, $\alpha_l^k$ is the fade amplitude associated with path l and user k, $\varphi_l^k = U[0,2\pi]$ represents the associated fade phase, $\tau_l^k$ is the path time-delay (which occurs below a predetermined duration threshold $T_{max}$), and $\vartheta_l^k$ denotes angle of arrival. The array response vector $\vec{V}(\vartheta)$ is expressed by:

$$\vec{V}(\vartheta) = [1 e^{-2\pi d_1 \cos \theta/\lambda} \ldots e^{-2\pi d_{M-1} \cos \theta/\lambda}]$$

where d$_m$ is the antenna separation, and λ is the wavelength corresponding to carrier frequency f$_c$. For a j$^{th}$ user's l$^{th}$ path, the n$^{th}$ bit at the beamformer output is given by:

$$z_l^j[n] = W^H(\vartheta_l^k) \int_{+(n-1)T_b}^{+nT_b} r(t) \cos(2\pi f_c t + \varphi_l^j) a^j(t - \tau_l^j - (n-1)T_b) dt$$

where $W(\vartheta_l^k)$ is the weighting vector of the beamforming system. $z_l^k[n]$ can be expressed by four components:

$$z_l^k[n] = S_l^j[n] + ISI_l^j[n] + IXI_l^j[n] + v_l^j[n]$$

where S is the desired signal, ISI is inter-symbol interference, IXI is cross interference (i.e., multiple-access interference), and v is the AWGN contribution. These components can be expressed as follows:

$$S_l^j[n] = \alpha_l^j W^H(\vartheta_l^j)\vec{V}(\vartheta_l^j)b^j[n]G$$

$$ISI_i^j[n] = \sum_{\substack{h=0 \\ h \neq l}}^{L^k-1} \sum_{n=0}^{N-1} \alpha_l^k W^H(\vartheta_h^j)\vec{V}(\vartheta_l^j)b^j[n]\cos(\varphi_h^j - \varphi_l^j)R_{jj}(\tau_l^j - \tau_h^j - nT_b)$$

$$IXI_i^j[n] = \sum_{\substack{k=1 \\ k \neq j}}^{K} \sum_{\substack{h=0 \\ h \neq l}}^{L^k-1} \sum_{n=0}^{N-1} \alpha_l^k W^H(\vartheta_h^k)\vec{V}(\vartheta_l^j)b^j[n]\cos(\varphi_h^k - \varphi_l^j)R_{kj}(\tau_l^j - \tau_h^j - nT_b)$$

$$v_l^j[n] = \int_{+(n-1)T_b}^{+nT_b} W^H(\vartheta_l^j)n(t)a^j(t - \tau_l^j)\cos(2\pi f_c t + \varphi_l^j)dt$$

where $W^H(\vartheta_l^j)\vec{V}(\vartheta_l^j)$ represents the spatial correlation, $\varphi_l^j$ and $\tau_l^j$ are the random phase and time delay for the $j^{th}$ user's $l^{th}$ path, G is the processing gain, and $R_{jj}$ and $R_{kj}$ are the partial auto-correlation and cross-correlation of the direct sequence code(s):

$$R_{kj}(\tau) = \int_\tau^T a^k(t)a^j(t - \tau)dt$$

Maximal ratio combining produces an output:

$$z^j[n] = \sum_{l=0}^{L-1} \alpha_l^j z_l^j[n]$$

which can be processed by a decision processor. In this case, the BER is given by:

$$P_e = \int_0^\infty Q(2r_o)f(r_o | \bar{r}_o)dr_o$$

where $\bar{r}_o$ is the mean value of the instantaneous SINR, $r_o$, and Q( ) represents the complementary error function.

It should be appreciated that the WTs may be adapted to perform either or both time-domain (e.g., Rake) or frequency-domain processing as part of a receiver operation. Signals received by a plurality of WTs may be combined with respect to any combining technique, including EGC, MRC, Minimum Mean Squared Error Combining, other types of optimal combining, Successive Interference Cancellation, and other matrix-reduction/matrix diagonalization techniques. Array-processing operations may include combinations of local and global processing. For example, diversity combining may be performed at each multi-element WT. Then signals from each WT may be combined (e.g., in a central processor) to perform sub-space (e.g., directional) processing. Other combinations of local and global processing may be employed. Similarly, combinations of sub-space processing (i.e., capacity enhancement) and diversity combining (i.e., signal-quality enhancement) may be performed. It should also be appreciated that the WTs may be adapted to perform either or both time-domain and frequency-domain processing for transmission. Thus, appropriate delays or complex weights may be provided to WT transmissions to produce a coherent phase front that converges at a predetermined WWAN destination node.

Figure 9A:
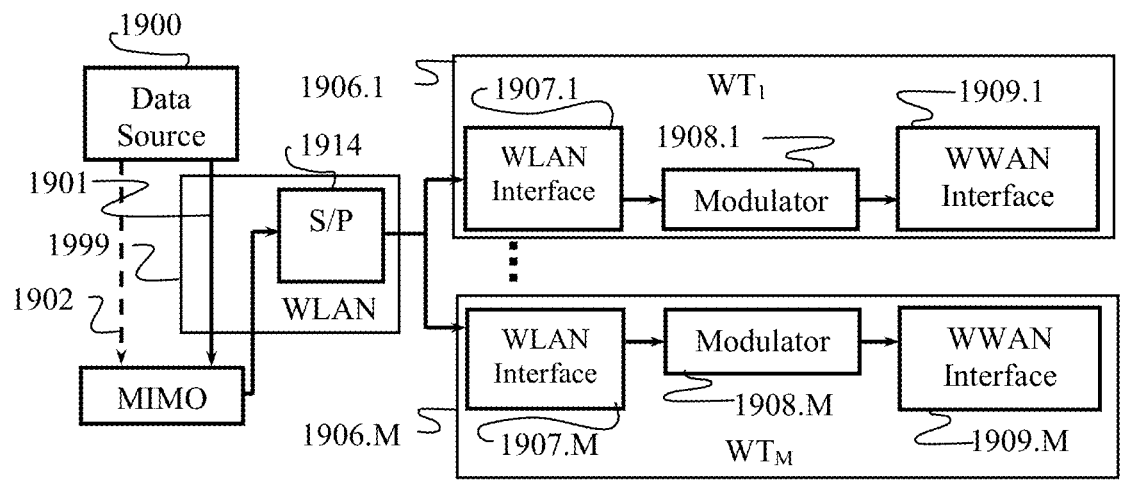
FIG. 9A illustrates an optional transmission embodiment of the present invention.

FIG. 9A illustrates an optional transmission embodiment of the present invention. That is, method and apparatus configurations can be inferred from the following descriptions. A data source 1900 is adapted to provide data for processing by an array processor, such as MIMO processor 1902. Optionally, other types of array processors may be provided. A physical (e.g., wired) connection 1902 and/or a wireless connection 1901 couple the data between the data source 1900 and the MIMO processor 1902. The wireless connection 1901 is enabled by a WLAN 1999. The MIMO processor 1902 is adapted to provide MIMO processing to the data, such as providing complex channel weights, providing spreading weights, and/or providing channel coding.

In one exemplary embodiment of the invention, MIMO processor 1902 provides convolutional or block channel coding to the data, which effectively spreads each data bit over multiple coded data bits. The resulting coded data bits are then grouped in serial blocks by the MIMO processor 1902. Signal-block outputs from the MIMO processor 1902 are provided with serial-to-parallel conversion by the WLAN 1999 (which is denoted by S/P 1914) and distributed to a plurality of WTs 1906.1-1906.M.

Each WT 1906.1-1906.M has a WLAN interface 1907.1-1907.M adapted to receive and demodulate the data received from the MIMO processor 1902. The MIMO processor 1902 is accordingly equipped with a WLAN interface that is not shown. The MIMO processor 1902 is typically comprised of one or more WTs 1906.1-1906.M. In some embodiments of the invention, MIMO processor 1902 may include at least one computer-processing terminal that does have a WWAN interface.

Data received from the MIMO processor 1902 is then modulated 1908.1-1908.M by each WT 1906.1-1906.M for transmission into a WWAN channel by a corresponding WWAN interface 1909.1-1909.M. Modulation 1908.1-1908.M typically includes mapping blocks of data bits to data symbols, which are then mapped to a modulation constellation. Modulation 1908.1-1908.M may also include channel coding and/or data interleaving. In an exemplary embodiment of the invention, modulation 1908.1-1908.M includes the application of complex WWAN channel weights. Such channel weights may optionally be provided by the MIMO processor 1902. In alternative embodiment of the invention, modulators 1908.1-1908.M provide a predetermined delay profile (provided by the MIMO processor 1902) to the data to be transmitted into the WWAN channel.

Figure 9B:
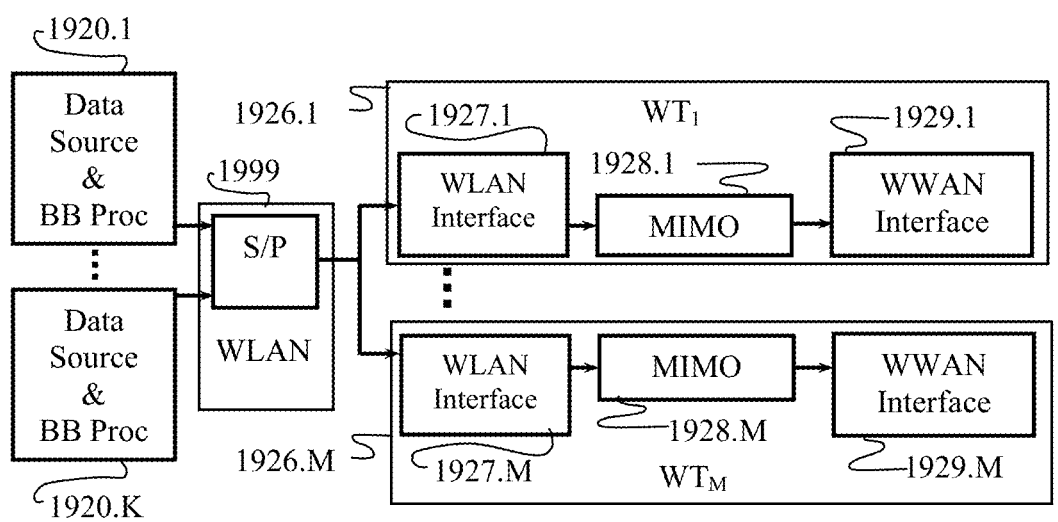
FIG. 9B illustrates a functional flow chart that pertains to transmitter apparatus and method embodiments of the invention.

FIG. 9B illustrates a functional flow chart that pertains to transmitter apparatus and method embodiments of the invention. One or more data sources 1920.1-1920.K are coupled via a WLAN 1999 to a plurality M of WTs 1926.1-1926.M. Each WT 1926.1-1926.M includes a WLAN interface 1927.1-1927.M, an array processor (such as a MIMO processor 1926.1-1926.M), and a WWAN interface 1929.1-1929.M.

The data sources 1920.1-1920.K optionally include baseband-processing capabilities, such as channel coding, interleaving, spreading, multiplexing, multiple-access processing, etc. The data sources 1920.1-1920.K include WLAN interfaces (not shown). The data sources 1920.1-1920.K may include one or more WTs 1926.1-1926.M.

The WLAN interfaces 1927.1-1927.M include apparatus and means for converting received signals that were formatted for transmission in the WLAN 1999 into baseband data signals. The MIMO processors 1926.1-1926.M are adapted to provide for frequency-domain and/or time-domain MIMO operations on the baseband data signals received from the WLAN interfaces 1927.1-1927.M. Alternatively, the MIMO processors 1926.1-1926.M may be adapted to perform phase operations at WWAN carrier frequencies transmitted by the WWAN interfaces 1929.1-1929.M. The WWAN interfaces 1929.1-1929.M provide any necessary baseband, IF, and RF operations necessary for transmitting data in a WWAN channel.

Figure 10A:
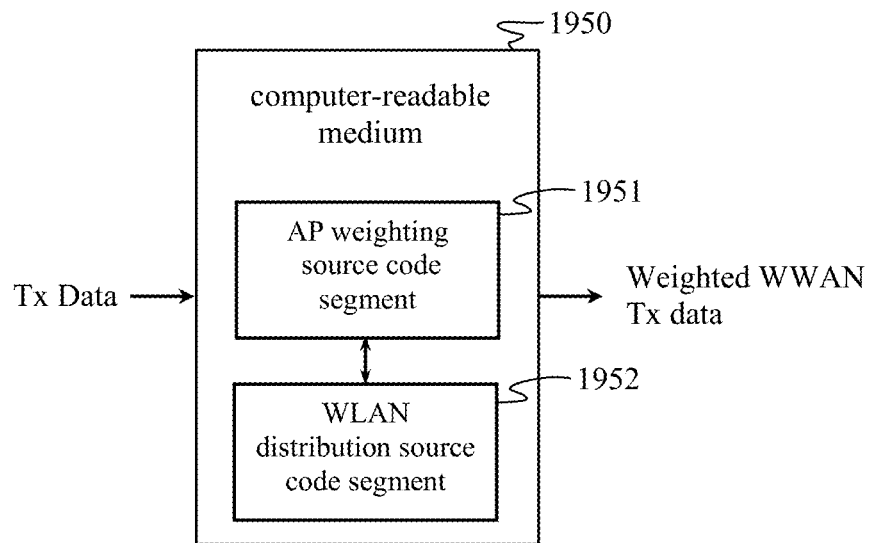
FIG. 10A illustrates software components of a transmission embodiment of the invention residing on a computer-readable memory.

FIG. 10A illustrates software components of a transmission embodiment of the invention residing on a computer-readable memory 1950. An array-processing weighting source-code segment 1951 is adapted to generate a plurality of array-element weights for an antenna array comprised of a plurality of WTs coupled to at least one WWAN. The array-element weights may include at least one of frequency-domain weights (e.g., complex sub-carrier weights) and time-domain weights (e.g., weighted Rake taps). The array-processing weighting source-code segment 1951 is adapted to accept as input at least one of a set of information inputs, including data signals for transmission into the WWAN, training signals (e.g., known transmission symbols) received from the WWAN, data signals (e.g., unknown transmission symbols) received from the WWAN, WWAN channel estimates, and WWAN-control information.

The array-processing weighting source-code segment 1951 is adapted to provide as output at least one of a set of information signals, including WWAN weights and weighted data for transmission into the WWAN (i.e., weighted WWAN data). A WLAN distribution source code segment 1952 is provided for distributing either or both WWAN weights and weighted WWAN data received from source-code segment 1951 to a plurality of WTs via at least one WLAN. The WLAN distribution source code segment 1952 may optionally function to couple at least one of a set of information inputs to the source-code segment 1951, including data signals for transmission into the WWAN (such as generated by other WTs), training signals received from the WWAN, data signals received from the WWAN, WWAN channel estimates, and WWAN-control information.

Figure 10B:
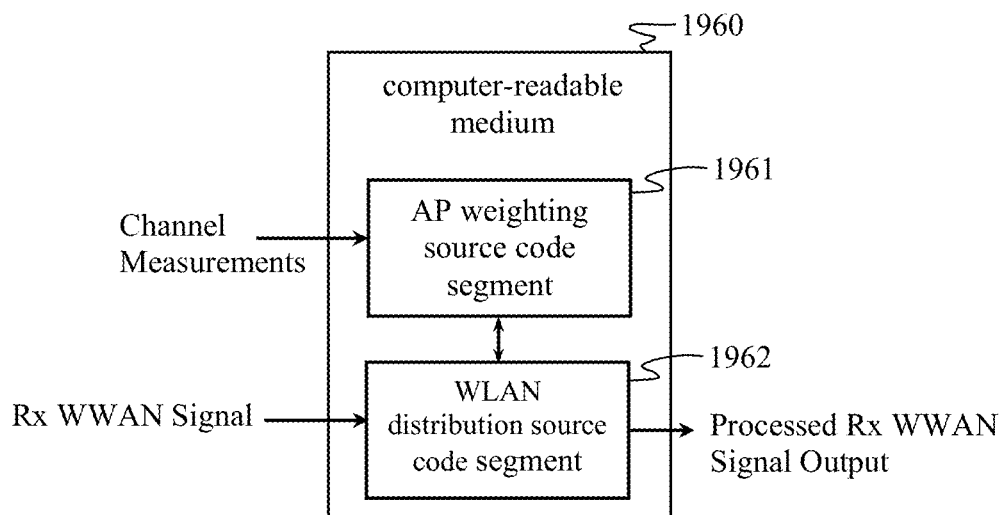
FIG. 10B illustrates software components of a receiver embodiment of the invention residing on a computer-readable memory.

FIG. 10B illustrates software components of a receiver embodiment of the invention residing on a computer-readable memory 1960. An array-processing weighting source-code segment 1961 is adapted to generate a plurality of array-element weights for an antenna array comprised of a plurality of WTs coupled to at least one WWAN. The array-element weights may include at least one of frequency-domain weights (e.g., complex sub-carrier weights) and time-domain weights (e.g., weighted Rake taps). The array-processing weighting source-code segment 1961 is adapted to accept as input at least one of a set of information inputs, including training signals (e.g., known transmission symbols) received from the WWAN, data signals (e.g., unknown transmission symbols) received from the WWAN, WWAN channel estimates, and WWAN-control information.

The array-processing weighting source-code segment 1961 is adapted to provide as output at least one of a set of information signals, including WWAN weights, weighted received WWAN data for transmission into the WLAN (i.e., weighted received WWAN data), weighted WWAN data received from a plurality of WTs connected by the WLAN and then combined (i.e., combined weighted WWAN data), and estimates of said combined weighted WWAN data. A WLAN distribution source code segment 1962 is provided for distributing at least one of a set of signals (including the WWAN weights, the weighted received WWAN data, the combined weighted WWAN data, and the estimates said combined weighted WWAN data) to a plurality of WTs via at least one WLAN. The WLAN distribution source code segment 1962 may optionally function to couple at least one of a set of information inputs to the source-code segment 1961, including WWAN data signals received by other WTs, training signals received from the WWAN by other WTs, WWAN channel estimates (either of both locally generated and received from other WTs), WWAN-control information, weights received from at least one other WT, and weighted WWAN data received from at least one other WT.

Since software embodiments of the invention may reside on one or more computer-readable memories, the term computer-readable memory is meant to include more than one memory residing on more than one WT. Thus, embodiments of the invention may employ one or more distributed-computing methods. In one embodiment of the invention, the computer-readable memory 1950 and/or 1960 further includes a distributed-computing source-code segment (not shown). It will be appreciated that many different types of distributed computing, which are well known in the art, may be performed. The WLAN distribution source code segment 1952 and/or 1962 may be adapted to provide for synchronizing transmitted and/or received WWAN signals.

Embodiments of the invention described herein disclose array-processing methods (including software implementations) and apparatus embodiments employed in a WWAN and coordinated between a plurality of WTs connected via at least one WWAN. WTs in a WLAN group typically share the same WWAN access. However, some embodiments of the invention provide for WTs with access to different WWANs. Furthermore, one or more WTs may have access to a plurality of WWANs and WWAN services. In some cases, one or more WTs may not be configured to access any WWAN.

In some embodiments of the invention, the computer-readable memory 1950 and/or 1960 further includes a WLAN setup source-code segment (not shown) capable of establishing and/or dynamically reconfiguring at least one WLAN group. For example, WTs may convey location information (e.g., GPS) and/or signal-strength information (e.g., in response to a WLAN probing signal) to the WLAN setup source-code segment (not shown). The WLAN setup source-code segment (not shown) may reside on one or more of the WTs and/or at least one WWAN terminal, such as a cellular base station.

The WLAN setup source-code segment (not shown) may provide one or more WLAN group configuration functions, including determining the number of WWAN-enabled WTs, the total number of WTs in the WLAN group, which WTs are active (and inactive), which WTs are in the WLAN group, and selecting which WT(s) has (have) network-control functionality. The WLAN setup source-code segment (not shown) may be adapted to perform WWAN channel quality analysis functions, including determining WWAN link performance (relative to one or more WTs) from training sequences or pilot signals, performing WWAN-channel estimation, receiving link performance or channel estimates from the WWAN, and performing channel-quality calculations (e.g., SNR, BER, PER, etc.).

The WLAN setup source-code segment (not shown) may select which WTs are WWAN-enabled based on one or more criteria points, including WWAN link performance, WLAN link performance, required transmission and/or reception needs (e.g., the number of WLAN-group WTs requesting WWAN services, the types of WWAN services required, individual and total throughput, required signal-quality threshold, and WWAN bandwidth available to the WLAN group), computational load, WLAN capacity, power-consumption load, diversity gain, and interference mitigation.

The WLAN distribution source code segments 1952 and 1962 may be adapted to route WWAN channel-access information to the WTs. For example, WWAN channel-access information can include multiple-access information (e.g., multiple-access codes, frequency bands, time slots, spatial (or sub-space) channels, etc.), power control commands, timing and synchronization information, channel coding, modulation, channel pre-coding, and/or spread-spectrum coding.

Figure 11:
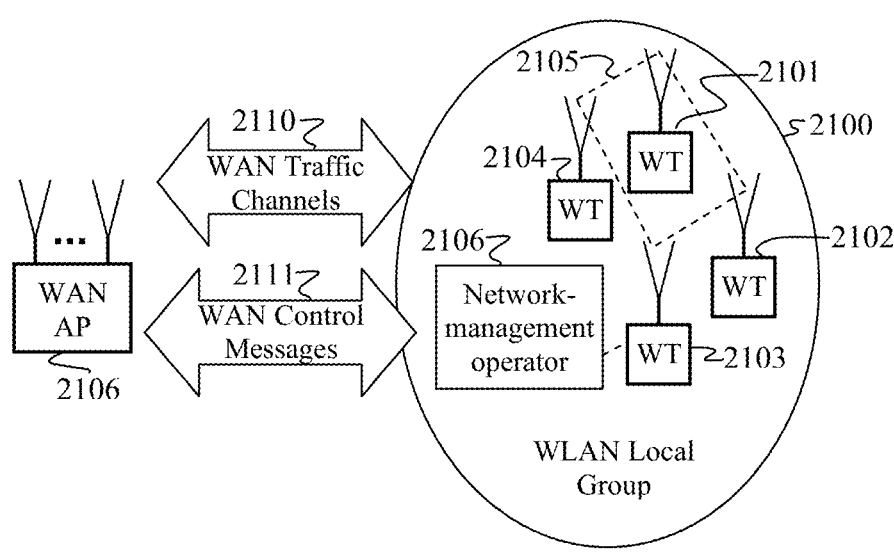
FIG. 11 shows a WWAN comprising a WWAN access point (e.g., a base station) and a local group comprising a plurality of wireless terminals communicatively coupled together via a WLAN. A network-management operator is configured to handle WWAN-control operations within the local group.

FIG. 11 shows a WWAN comprising a WWAN access point (e.g., a base station) 2120 and a local group 2100 comprising a plurality of wireless terminals (WTs) 2101-2104 communicatively coupled together via a WLAN 2105. A network-management operator 2106 is configured to handle WWAN-control operations within the local group 2100. In an exemplary embodiment, the network-management operator 2106 is coupled to at least one of the WTs 2101-2104 (e.g., WT 2103). One or more of the WTs 2101-2104 may be configured to transmit and/or receive WWAN communication signals, such as WWAN traffic channels 2110 and WWAN control messages 2111. Signals in the WWAN traffic channels 2110 may be processed by one or more of the WTs 2101-2104, which may include at least one local area network controller (e.g., 2103). The WWAN control messages 2111 are processed by the network-management operator 2106.

In an exemplary embodiment of the invention, a target WT (e.g., WT 2104) communicates with one or more WTs in the local group 2100 via the WLAN 2105, and the local group 2100 is configured to communicate with the base station 2120 via the WWAN. More specifically, one or more of the WTs 2101-2104 may be configured to participate in WWAN communications at any particular time. The target WT 2104 may communicate with the network controller (e.g., WT 2103), which is configured to communicate with other WTs in the local group 2100. The network controller 2103 typically oversees network control functions in the local area network. Alternatively, the target WT 2104 may function as a local area network controller. A particular WT may determine which WTs to use for transmitting and/or receiving signals in the WWAN based on local area network criteria, as well as WWAN-related criteria. Local area network control and/or WWAN control functionality may be distributed between one or more WTs in the local group.

Figure 12:
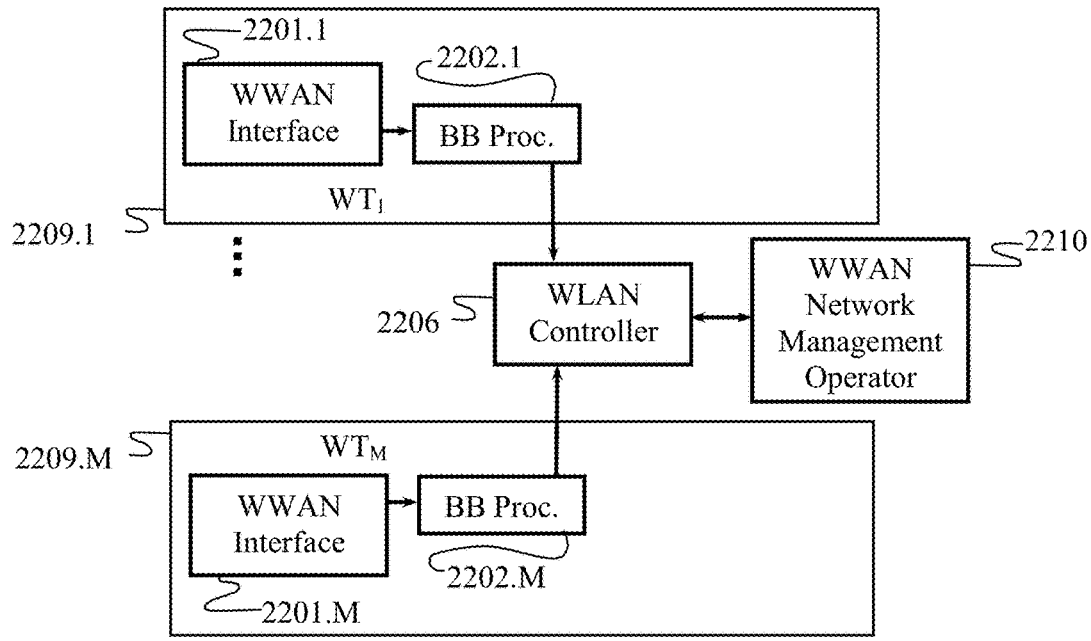
FIG. 12 is a block diagram of a communication system comprising a WLAN for communicatively coupling a plurality of mobile wireless terminals to a WLAN controller, and a network-management operator for cooperatively processing WWAN-control messages for the mobile wireless terminals.

In FIG. 12, a communication system comprises a plurality M of WTs 2209.1-2209.M communicatively coupled together in a WLAN, which comprises a WLAN controller 2206. A WWAN network-management operator 2210 is communicatively coupled to the WLAN controller 2206. WWAN network-management operator 2210 is configured for cooperatively processing WWAN-control messages for the WTs 2209.1-2209.M, each of which comprises at least one WWAN interface 2201.1-2201.M, respectively.

According to one aspect of the invention, the WWAN interfaces 2201.1-2201.M receive WWAN control messages from the WLAN that were processed by the WWAN network-management operator 2210 and transmit those messages into the WWAN. According to another aspect of the invention, the WWAN interfaces 2201.1-2201.M receive WWAN control messages from the WWAN and couple those messages through the WLAN to the WWAN network-management operator 2210. According to yet another aspect of the invention, one or more WTs functions as the WWAN network-management operator 2210. Thus, the WWAN network-management operator 2210 may comprise one or more WWAN interfaces and be configured to transmit WWAN control messages into the WWAN.

For the purpose of the present disclosure, a WWAN comprising a plurality of wireless terminals communicatively coupled together via a WLAN may be defined as one or more of the following system configurations:

A plurality of WTs in a local group configured to receive from a base station a signal intended for at least one WT.

A plurality of WTs in a local group configured to receive from a base station a plurality of signals modulated on interfering (e.g., common) channels and intended for at least one WT.

A plurality of WTs in a local group configured to receive from a base station a plurality of signals modulated on different non-interfering channels and intended for at least one WT.

A plurality of WTs in a local group configured to receive from a plurality of base stations a signal modulated on a common channel intended for at least one WT.

A plurality of WTs in a local group configured to receive from a plurality of base stations a signal redundantly modulated on a plurality of different channels intended for at least one WT.

A plurality of WTs in a local group configured to receive from a plurality of base stations a plurality of signals modulated on interfering channels and intended for at least one WT.

A plurality of WTs in a local group configured to receive from a plurality of base stations a plurality of signals modulated on different non-interfering channels and intended for at least one WT.

A plurality of WTs in a local group configured to transmit to a base station a signal originating from at least one WT.

A plurality of WTs in a local group configured to transmit to a base station a plurality of signals modulated on interfering (e.g., common) channels originating from at least one WT.

A plurality of WTs in a local group configured to transmit to a base station a plurality of signals modulated on different non-interfering channels originating from at least one WT.

A plurality of WTs in a local group configured to transmit to a plurality of base stations a signal modulated on a common channel originating from at least one WT.

A plurality of WTs in a local group configured to transmit to a plurality of base stations a signal redundantly modulated on a plurality of different channels originating from at least one WT.

A plurality of WTs in a local group configured to transmit to a plurality of base stations a plurality of signals modulated on interfering channels originating from at least one WT.

A plurality of WTs in a local group configured to transmit to a plurality of base stations a plurality of signals modulated on different non-interfering channels and originating from at least one WT.

A plurality of WTs in a first local group configured to receive from a second local group a signal intended for at least one WT in the first local group.

A plurality of WTs in a first local group configured to receive from a second local group a plurality of signals modulated on interfering channels and intended for at least one WT in the first local group.

A plurality of WTs in a first local group configured to receive from second local group a plurality of signals modulated on different non-interfering channels and intended for at least one WT in the first local group.

A plurality of WTs in a first local group configured to transmit to a second local group a signal originating from at least one WT in the first local group.

A plurality of WTs in a first local group configured to transmit to a second local group a plurality of signals modulated on interfering channels and originating from at least one WT in the first local group.

A plurality of WTs in a first local group configured to transmit to a second local group a plurality of signals modulated on different non-interfering channels and originating from at least one WT in the first local group.

A base station comprising a plurality of WTs in a base station local group configured to transmit a signal intended for at least one subscriber WT not in the base station local group.

A base station comprising a plurality of WTs in a base station local group configured to transmit a plurality of signals modulated on interfering (e.g., common) channels and intended for at least one subscriber WT not in the base station local group.

A base station comprising a plurality of WTs in a base station local group configured to transmit a plurality of signals modulated on different non-interfering channels and intended for at least one subscriber WT not in the base station local group.

Multiple base stations comprising at least one base station local group configured to transmit a signal modulated on a common channel intended for at least one WT.

Multiple base stations comprising at least one base station local group configured to transmit to a plurality of WTs a signal redundantly modulated on a plurality of different channels intended for at least one WT.

Multiple base stations comprising at least one base station local group configured to transmit to a plurality of WTs a plurality of signals modulated on interfering channels and intended for at least one WT.

Multiple base stations comprising at least one base station local group configured to transmit to a plurality of WTs a plurality of signals modulated on different non-interfering channels and intended for at least one WT.

A base station comprising a plurality of WTs in a base station local group configured to receive a signal originating from at least one WT.

A base station comprising a plurality of WTs in a base station local group configured to receive a plurality of signals originating from at least one WT and modulated on interfering channels.

A base station comprising a plurality of WTs in a base station local group configured to receive a plurality of signals modulated on different non-interfering channels and originating from at least one WT.

Multiple base stations comprising at least one base station local group configured to receive a signal modulated on a common channel originating from at least one WT.

Multiple base stations comprising at least one base station local group configured to receive a signal redundantly modulated on a plurality of different channels originating from at least one WT.

Multiple base stations comprising at least one base station local group configured to receive a plurality of signals modulated on interfering channels and originating from at least one WT.

Multiple base stations comprising at least one base station local group configured to receive a plurality of signals modulated on different non-interfering channels and originating from at least one WT.

Figure 13:
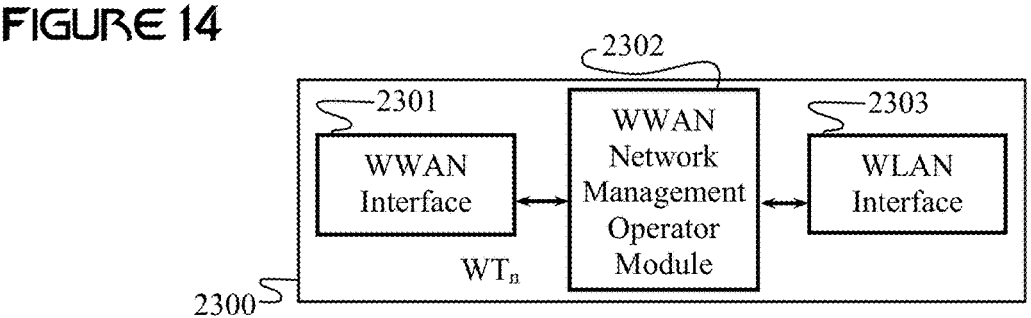
FIG. 13 is a block diagram of a mobile wireless terminal in accordance with an aspect of the invention in which a WWAN network management operator module is communicatively coupled to at least one other mobile wireless terminal via a WLAN and communicatively coupled to the WWAN.

A WWAN network-management operator may include a single WT or a plurality of WTs. In one embodiment, the WWAN network-management operator includes a single WT communicatively coupled to the WWAN and configured to perform WWAN-control operations for one or more WTs in the local group. For example, a block diagram of a WT 2300 shown in FIG. 13 comprises a WWAN network-management operator module 2302 communicatively coupled to a WWAN interface 2301 and a WLAN interface 2303. In another embodiment, the WWAN network-management operator may comprise WWAN network-management operator modules residing in a plurality of WTs. Thus, the WWAN network-management operator may be configured to transmit and/or receive WWAN-control parameters in the WWAN on behalf of one or more WTs in the local group. A local area network controller may also include a WWAN network-management operator module and may perform WWAN network management for one or more WTs in the group.

Each WT may function as its own network-management operator. For example, a WT functioning as its own network-management operator may be communicatively coupled to the WWAN and configured to transmit and receive WWAN control information directly with the WWAN, whereas traffic-channel processing may be performed in cooperation with one or more other WTs in the local group. In another exemplary configuration, WWAN control information may be coupled from a target WT (e.g., a source or destination WT relative to the subject information, i.e., the WWAN control information) to a relay WT communicatively coupled to the WWAN and configured to transmit and receive the target WT's WWAN control information. While the target WT functions as its own network-management operator, it may employ other WTs in the local group to transmit and receive WWAN control messages. Thus, the relay WT may merely function as a pass through having optional added physical-layer adjustments for the WWAN control information. The physical-layer adjustments may be used to condition the WWAN control messages for the WWAN channel and/or the WLAN channel. Similarly, a WT functioning as a network-management operator for itself and/or at least one other WT may employ one or more WTs in the local group for transmitting and receiving WWAN control messages in the WWAN.

In another embodiment, a WT may function as a network-management operator for one or more other WTs. For example, a network controller may function as a network-management operator for at least one other WT. In another embodiment, at least one WT that is neither a network controller nor a target WT may function as the network-management operator. For example, a WT having the best WWAN channel (such as may be determined by any of a variety of signal quality criteria that are well known in the art) may be selected as the network-management operator. Various criteria for selecting WTs for network-management operator responsibilities may be implemented, including load balancing.

In another embodiment of the invention, a plurality of WTs in a local group may simultaneously function as a network-management operator. The network-management operator may comprise multiple WTs including a target WT, multiple WTs including a network controller, multiple WTs not including a network controller, or multiple WTs not including a target WT. A plurality of WTs may redundantly process WWAN control messages. Alternatively, each of a plurality of WTs configured to perform WWAN-control operations may be configured to perform a predetermined subset of the WWAN-control operations.

A network-management operator may participate in any combination of various WWAN-control operations, including power control, data-rate control, session control, authentication, key exchange, paging, control-channel monitoring, traffic channel request, channel assignment, error detection, acknowledgement, request for retransmission, identification, reconnects, synchronization, flow control, request for service from a particular sector or access point, hand-off.

Figure 14:
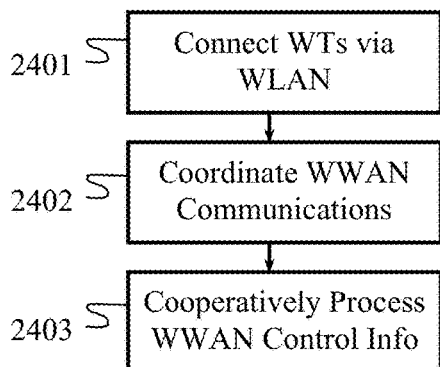
FIG. 14 illustrates a method in accordance with an aspect of the invention in which WWAN communications for a group of wireless terminals are cooperatively processed.

FIG. 14 is a flow diagram of a communication method configured in accordance with an aspect of the invention. A WLAN is employed for sharing WWAN control information between a group of WTs 2401. WWAN control information is coordinated between the group of WTs and the WWAN 2402, and WWAN control information is cooperatively processed by the group 2403.

The Open Systems Interconnection Reference Model (OSI Reference Model) may be used to describe the function of a WWAN comprising a local group of a plurality of WTs communicatively coupled together via a WLAN.

In the Application Layer, each WT typically employs its own user applications for accessing network services (e.g., login, data upload, data download, multi-media processing). Thus, each WT handles its own application-layer network access, flow control, and error processing. Each WT controls its own user interface for access to services that support user applications. These applications typically are not subject to cooperative access (e.g., sharing). However, certain network resources (e.g., printers, faxes) may be shared. Some applications, such as computational processing applications, may provide for distributed computing processes between WTs in a network. However, such distributed-computing applications have not been employed in the prior art for receiving and decoding wireless communications.

In the Presentation Layer, each WT may translate data from an application format to a network format and vice-versa. Different data formats from different applications are processed to produce a common data format. Each WT may manage its own protocol conversion, character conversion, data encryption/decryption, and data compression/expansion. Alternatively, a network controller that serves multiple WT may perform one or more presentation-layer functions. For example, data-processing intelligence may be handled by a network controller, and individual WTs may function as dumb terminals. In some multimedia applications, a network controller may function essentially as a media server configured to deliver predetermined data formats to each WT functioning as a media device. Furthermore, there are various degrees of how presentation-layer processing may be shared between WTs and a network controller.

In the Session Layer, each WT may be responsible for identification so only designated parties can participate in a session. Session setup, reconnects, and synchronization processes may be managed by the target WT (e.g., a subscriber, an access point, or a base station), which functions as its own network-management operator for session-layer processing. Alternatively, a network controller may manage session-layer activities for each of one or more WTs in the local group. The network controller may store identities for each WT and manage sessions and the flow of information for each WT.

In another embodiment, multiple WTs may participate in session management. Some centralized decision-processing (such as by the target WT or a network controller) may be employed to direct one or more WTs to perform specific session-layer activities. Multiple responsibilities may be divided among the WTs. For example, one WT may conduct synchronization processes and another WT may perform session setup. The WTs assigned to perform particular functions may change with respect to signal quality with the WWAN, load balancing criteria, and/or other considerations.

In the Transport Layer, each WT may convert data streams into packets or predetermined segments. Each WT may also process received packets to reassemble messages. Thus, each WT may perform its own error handling, flow control, acknowledgement, and request for retransmission.

Alternatively, a network controller may manage transport-layer operations for each of one or more WTs in a local group. The network controller may be configured to convert data streams received from the WTs into packets. Similarly, the WT may convert data packets received from the WWAN into data streams that are routed to the appropriate WTs. The network controller may perform common network-management operator functions, including error handling, flow control, acknowledgement, and request for retransmission for each of the WTs.

In yet another embodiment, multiple WTs may be used to convert data streams into packets and/or process received packets to reassemble messages for a particular target WT. Each of a plurality of WTs may process only a portion of the received data stream and perform error handling, flow control, acknowledgement, and request for retransmission for the data it processes. Alternatively, multiple WTs may handle the same data. For example, redundant transport-layer processing may be performed by different WTs having uncorrelated WWAN channels in order to reduce errors, and thus, requests for retransmission. In another embodiment, only one WT may handle transport-layer processing at any given time. For example, a particular WT may be assigned to handle transport-layer processing if it has favorable WWAN-channel conditions. Other criteria, such as load balancing, may be used to select and transfer transport-layer processing responsibilities between WTs.

In the Network Layer, WTs may perform their own network-layer processing, such as addressing and routing. A WT, such as a router, a base station, a switch, or a relay may perform network-layer processes, including managing data congestion, adjusting data frames, packet switching, and routing. In addition to managing network-layer control within its local group, a network controller may perform network-layer processes for the WWAN.

The Data Link layer includes a Media Access Control (MAC) sub-layer and the Logical Link Control (LLC) sub-layer. Each WT may perform Data-link processing, such as converting received raw data bits into packets and managing error detection for other WTs. Similarly, each WT may convert data packets into raw data bits for one or more other WTs. In one embodiment, a target WT may perform its own data-link processing. Alternatively, a network controller may perform data-link processing for one or more WTs.

A Physical layer embodiment may provide for performing all physical-layer processes by a target WT. For example, a target WT distributes spread, scrambled baseband data to the other WTs, which then up convert and transmit the target's transmission signal as specified by the target WT. Similarly, each WT may receive and down convert WWAN transmissions and direct the down-converted signal via the WLAN for processing (e.g., descrambling and despreading) by a target WT.

In one embodiment, physical-layer processes may be divided between a target WT and other WTs in a local group. For example, the target WT may convey baseband data and control parameters to other WTs, which then spread and scramble the baseband data with respect to the control parameters. Additional control parameters, such as power control, and data rate control may be specified. Similarly, WTs in a local group may descramble and despread received data for further processing by a target WT. WTs may monitor control channels for signals addressed to any of a plurality of WTs in a local group.

In yet another embodiment, a network controller may perform some or all physical-layer processes corresponding to a target WT. A network controller may perform all physical-layer processes for a target WT (and other WTs in the corresponding local group if it performs higher-layer processes for the target WT). Alternatively, some of the higher-layer processes may be performed by the network controller and/or other WTs as part of a distributed computing procedure regardless of how the physical-layer processes are performed.

Several aspects of physical-layer processing include WWAN-control operations. Other WWAN-control operations may fall within any of a plurality of the OSI reference model layers. Embodiments and interpretations of the invention should not be constrained to the limitations of the OSI reference model. The OSI reference model is a generalization that may not be suitable for expressing the implementation of all WWAN-control operations.

In one aspect of the invention, a cellular base station may transmit a probe signal (e.g., a predetermined signal that is ramped in signal power) to a plurality of subscriber WTs. A network-management operator in a local group of WTs may be responsive to the probe signal for indicating a signal power level capable of being received from the base station. Similarly, the signal power level may be used as an indicator for transmit power and/or data rate.

Functions of the network-management operator may be distributed over a plurality of WTs in the local group, and network-management responsibilities may be shared by more than one WT and/or dynamically assigned to particular WTs. For example, a WT that first detects the probe signal may be assigned subsequent network-management responsibilities, such as predicting forward-link SINR and an associated achievable data rate, sending an acknowledgement to the base station, or requesting a particular data rate (e.g., sending a dynamic rate control signal to the base station). In another embodiment of the invention, WWAN signals received by a group of WTs may be combined before being processed by a network-management operator.

In one embodiment of the invention, a network-management operator in a local group performs open loop estimation to adjust reverse link (i.e., local group) transmit power. Alternatively, closed-loop power corrections may involve both the network-management operator and the base station. The network-management operator may send an access probe sequence and wait for an acknowledgement from a base station. Initial probe power is typically determined via power control.

A WT in the local group is typically denoted as being in an inactive state relative to the WWAN when it is not assigned a forward traffic channel. However, the network-management operator may assign one or more WWAN traffic channels to WTs that the WWAN considers inactive. In such cases, inactive WTs may help transmit and/or receive WWAN communications intended for active WTs in the local group. Similarly, active WTs may be assigned additional traffic channels by the network-management operator for transmitting and/or receiving WWAN communications intended for other active WTs in the group. Such assignments may be invisible to the WWAN, since so-called inactive WTs are used for connecting active WTs to the WWAN. In other embodiments of the invention, complex assignments, including sharing traffic channels between WTs, may be implemented.

A network-management operator may service one or more WTs in a variable-rate state. For example, a forward traffic channel is transmitted at a variable rate determined by the network-management operator's data rate control value. The network-management operator may determine the maximum data rate using any of a variety of well-known techniques. The network-management operator uses a data rate control channel to instruct the WWAN what data rate to serve to a particular WT in the local group. In response, the base station selects modulation, channel coding, power and/or number of multiple-access slots.

The network-management operator may direct its instructions to the best base station (i.e., the base station having the best channel relative to the local group) in its active set via addressing (e.g., a covering code). Alternatively, the network-management operator may instruct multiple base stations to serve the local group. This may occur when WTs can access more than one WWAN. This may also occur when some WTs are better served by one base station or sector while other WTs in the same local group are better served by a different base station or sector.

A WT enters a fixed-rate state when its network-management operator signals a request for a specific fixed rate from a base station or sector. The WT may transition to a variable rate if it cannot receive packets at the previously requested fixed rate. A network-management operator may select a fixed rate if there is an imbalance (e.g., different channel conditions) between the forward and reverse links.

In one aspect of the invention, a network-management operator is configured to perform connection-layer protocols that are typically conducted between a target WT and the base station. For example, the network-management operator may participate in acquisition and initialization state protocols, air link management protocols, connection state protocols, route updates, and/or idle state protocols.

A WT in an inactive state typically awakes from a sleep state periodically to monitor a control channel to receive overhead parameter messages and paging messages. In one aspect of the invention, a network-management operator may wait for an activate command from a default air link management protocol. A network-management operator may monitor a WWAN control channel for multiple WTs in a local group. In an alternative embodiment, WTs in the local group may take turns monitoring the WWAN control channel. In this case, responsibilities of the network-management operator are transferred between WTs in the local group. In another embodiment, a plurality of WTs may monitor the WWAN control channel, wherein each WT is configured to monitor the channel for only a subset of WTs in the local group.

In a network determination state, the network-management operator selects a channel on which to acquire a base station for a WT in the local group. After selecting a channel, the network-management operator enters a pilot acquisition state in which the network-management operator tunes to a particular channel and searches for the strongest pilot signal. Upon acquiring a pilot, the network-management operator enters a synchronization state. At this point, the network-management operator may transfer synchronization responsibilities to the target WT. If the network-management operator (or the target WT) is unable to obtain a pilot, it reverts back to the network determination state.

In the synchronization state, the network-management operator or the target WT looks for a sync message on the control channel and sets its clock to the time specified in the sync message. Failure to receive the sync message or similar failures may result in returning to the network determination state.

The base station undergoes various state transitions in the process of serving the WTs. In an initialization state, the base station activates an initialization state protocol, overhead message protocol, and a control channel MAC protocol. A network-management operator may selectively route certain messages through WTs in a local group comprising the base station while reserving other messages for WWAN transmission only by the base station.

An idle state occurs after the network is acquired, but before an open connection is established. The base station initiates an idle state protocol, overhead messages protocol, route update protocol, control channel MAC protocol, access channel MAC protocol, and forward and reverse channel MAC protocols. In the connected state, base station and the target WT have an open connection until the connection is closed (i.e., goes to the idle state) or network redirection (goes to the initialization state). The base station activates a connected state protocol, overhead messages protocol, route update, control channel MAC protocol, and forward and reverse channel MAC protocols.

A network-management operator may be configured to direct handoffs between WWAN sectors, base stations, and/or networks. In one embodiment, a network-management operator in a local group may measure the SINR on each pilot in an active set (e.g., a set of base stations that actively serve the local group) and request data from the sector having the highest SINR. The network-management operator predicts the SINR for the next packet and request a higher data rate if it can decode it at that SINR. The rate request (which may include data rate, format, and modulation type) is sent by the network-management operator to the appropriate sector using a data rate control channel.

Generally, the network-management operator requests data from only one sector at a time. However, different WTs in a local group serving a particular target WT may request WWAN channels from multiple sectors at a time on identical or different WWAN channels. The network-management operator may coordinate requests for channels from different sectors. Multiple sectors (or base stations) may be configured to serve the same WWAN channel simultaneously. Alternatively, multiple WWAN channels may be used to serve one WT in the group. Although the target WT may have a better connection with a particular base station, the local group as a whole may have a better connection with a different base station. Thus, the network-management operator may dictate that the link be established and maintained relative to the group's connection rather than the target WT's connection.

A base-station scheduler may allocate physical channels for WTs. However, a network-management operator in a local group may provide logical channel assignments to the WTs that are invisible to the physical channel operation of the WWAN. Multiple WTs in a local group may utilize a single WT channel, such as for packet switched data communications. Each WT may utilize multiple physical channels, such as when higher data rates are required. The network-management operator may assign logical channels to various physical WWAN channels, and thus, effectively hand off those data channels to other sectors, base stations, or WWAN networks serving those physical WWAN channels.

Data rates requested by WTs may follow a channel fading process, wherein higher data requests occur when channel conditions are favorable and lower rates are requested as the channel degrades. It is well known that when a base station serves a large number of WTs, that diversity of multiple units can mitigate system-wide variations in data rate due to changing channel conditions. Multi-user diversity teaches that the opportunity for serving good channels increases with the number of users, which increases total network throughput.

One embodiment of the invention may provide for a network-management operator that dynamically selects one WT in a local group to communicate with a WWAN at a particular time, even though one or more channels may be served between the base station and the local group. The selection of which WT in the group communicates with the WWAN may change with changing channel conditions between the local group and the base station(s). Thus, the update rate for the dynamic selection may be based on the rate of change of WWAN channel conditions. This embodiment may be adapted for simultaneous communication by multiple WTs and/or the use of multiple base stations and/or WWANs. In another exemplary embodiment, the network-management operator may interleave communications (e.g., packets) across multiple WWAN channels undergoing uncorrelated channel distortions. Similarly, a WWAN specifically configured to interact with a local group may interleave messages across multiple WWAN channels transmitted to the local group. Different WWAN channels may be transmitted and received by one base station or a plurality of base stations. This type of interleaving (at either the local group and the base station) may be determined by a network-management operator.

In another embodiment, a network-management operator may be configured to redundantly transmit data symbols over multiple slots or physical channels to reduce transmission power or to allocate more power to data.

A network-management operator may employ an authentication protocol to authenticate traffic between a base station and a MT. For example, a network-management operator may identify a particular WT in a local group to a base station. The base station may then verify that the WT has a legitimate subscription record with a service provider that utilizes the WWAN. Upon verification, the base station allows access to the air interface and the network-management operator (whose responsibilities may be transferred to the WT) signs access channel packets to prove it is the true owner of the session. In one exemplary embodiment of the invention, the WT and/or the network-management operator may use IS-856 Air Interface Authentication.

In one embodiment of the invention, a target WT includes a network-management operator that employs other WTs in its local group to interact with a WWAN. In this case, authentication may be performed only with the target WT. In an alternative embodiment, the network-management operator resides in at least one other WT, such as a network controller. Thus, authentication may be performed with a network-management operator in a single terminal that is configured to perform authentication for more than one WT.

A network-management operator may employ a key exchange protocol (e.g., a Diffie-Hellman algorithm) for exchanging security keys between a WT and a WWAN for authentication and encryption. Typically, there is some predetermined key exchange algorithm used within a particular WWAN. Public values are exchanged and then messages are exchanged between the WT and the WWAN to indicate that the session keys have been correctly calculated. The keys may be used by the WT and the WWAN in an encryption protocol to encrypt traffic.

In one embodiment of the invention, a network-management operator resides on a target WT that accesses the WWAN via multiple WTs in a local group. The network-management operator may be configured to encrypt and decrypt WWAN traffic for the target WT without vital security information being made available to WTs other than the target WT. In another embodiment, the network-management operator may reside in a network controller. In this case, the network-management operator may be configured to engage in security protocols for more than one WT in the local group. Network-management operators according to various embodiments of the invention may be configured to participate in security protocols used to provide crypto sync, time stamps, and other elements used in authentication and encryption protocols.

All publications and patent applications mentioned in this specification are herein incorporated by reference to the same extent as if each individual publication or patent application was specifically and individually incorporated by reference.

Various embodiments of the invention may include variations in system configurations and the order of steps in which methods are provided. In many cases, multiple steps and/or multiple components may be consolidated.

The method and system embodiments described herein merely illustrate the principles of the invention. It should be appreciated that those skilled in the art will be able to devise various arrangements, which, although not explicitly described or shown herein, embody the principles of the invention and are included within its spirit and scope. Furthermore, all examples and conditional language recited herein are intended to be only for pedagogical purposes to aid the reader in understanding the principles of the invention. This disclosure and its associated references are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated by those skilled in the art that the block diagrams herein represent conceptual views of illustrative circuitry, algorithms, and functional steps embodying the principles of the invention. Similarly, it should be appreciated that any flow charts, flow diagrams, signal diagrams, system diagrams, codes, and the like represent various processes which may be substantially represented in computer-readable medium and so executed by a computer or processor, whether or not such computer or processor is explicitly shown.

The functions of the various elements shown in the drawings, including functional blocks labeled as "processors" or "systems," may be provided through the use of dedicated hardware as well as hardware capable of executing software in association with appropriate software. When provided by a processor, the functions may be provided by a single dedicated processor, by a shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, read-only memory (ROM) for storing software, random access memory (RAM), and non-volatile storage. Other hardware, conventional and/or custom, may also be included. Similarly, the function of any component or device described herein may be carried out through the operation of program logic, through dedicated logic, through the interaction of program control and dedicated logic, or even manually, the particular technique being selectable by the implementer as more specifically understood from the context.

Any element expressed herein as a means for performing a specified function is intended to encompass any way of performing that function including, for example, a combination of circuit elements which performs that function or software in any form, including, therefore, firmware, microcode or the like, combined with appropriate circuitry for executing that software to perform the function. The invention as defined herein resides in the fact that the functionalities provided by the various recited means are combined and brought together in the manner which the operational descriptions call for. Applicant regards any means which can provide those functionalities as equivalent as those shown herein.

The invention claimed is:

1. A method, comprising:
selecting a plurality of nodes in an array-processing network to provide for sub-space processing;
communicatively coupling the plurality of nodes to a central processor;
determining a Multiple Input Multiple Output (MIMO) channel response matrix that characterizes a transfer function of a MIMO system that comprises the plurality of nodes; and
in the central processor, diagonalizing the MIMO channel response matrix to produce a plurality of independent MIMO channels for at least one of uplink signals and downlink signals to provide for increased capacity.

2. The method recited in claim 1, wherein selecting comprises determining at least one quality metric, the at least one quality metric comprising the channel state information, channel quality, received signal strength, and link performance, the plurality of nodes being selected based on the at least one quality metric.

3. The method recited in claim 1, wherein the plurality of nodes comprises at least one of a set, the set comprising a plurality of subscriber-side devices, a plurality of server-side devices, and at least one subscriber-side device and at least one server-side device.

4. The method recited in claim 1, wherein the central processor comprises at least one of a processing system residing in at least one central processing facility, at least one node that is not part of the array-processing network, and at least one of the plurality of nodes in the array-processing network.

5. The method recited in claim 1, wherein diagonalizing the MIMO channel response matrix comprises employing distributed computing resources comprising a plurality of networked computers configured to interact with each other.

6. The method recited in claim 1, further comprising configuring the central processor to perform Physical Layer processing and at least one of Data Link Layer processing, Network Layer processing, Transport Layer processing, Session Layer processing, and Presentation Layer processing of baseband signals.

7. The method recited in claim 1, wherein the plurality of nodes is connected to the central processor by at least one of an optical fiber network, a wired network, a radio network, a free-space optical network, and an infrared network.

8. The method recited in claim 1, wherein diagonalizing the MIMO channel response matrix comprises at least one of spatial multiplexing, spatial demultiplexing, and sub-space processing combined with power control.

9. The method recited in claim 1, wherein diagonalizing the MIMO channel response matrix comprises at least one of maximum ratio combining, matrix inversion, successive interference cancellation, eigenvalue decomposition, eigenmode decomposition, multi-user detection, blind source separation, zero forcing, maximum likelihood combining, iterative feedback processing, minimum mean square error processing, soft decision processing, hard decision processing, and mixed decision processing.

10. The method recited in claim 1, wherein selecting comprises selecting a first cooperative antenna array comprising a first plurality of antennas residing on multiple ones of the plurality of nodes to serve a first node, and selecting a second cooperative antenna array comprising a second plurality of antennas residing on multiple ones of the plurality of nodes to serve a second node, the first plurality of antennas being different from the second plurality of antennas.

11. The method recited in claim 1, wherein each of the plurality of nodes comprises a clock that is employed for synchronizing processing operations.

12. The method recited in claim 1, wherein determining comprises at least one of
- a closed-loop spatial multiplexing communication mode in which the channel response matrix comprises channel estimates transmitted in feedback signals from each subscriber unit to the plurality of nodes; and
- an open-loop spatial multiplexing communication mode in which the channel response matrix is determined from the each subscriber unit's transmitted training signals received at the plurality of nodes.

13. A non-transitory computer-readable medium including processor-executable code for storing instructions operable to perform the method recited in claim 1.

* * * * *